(12) United States Patent
Kong et al.

(10) Patent No.: US 10,759,310 B2
(45) Date of Patent: Sep. 1, 2020

(54) VEHICLE SEAT AND METHOD FOR CONTROLLING SITTING POSITION USING THE SAME

(71) Applicants: Hyundai Motor Company, Seoul (KR); Kia Motors Corporation, Seoul (KR); Das Co., LTD, Yongin, Gyeonggi-do (KR)

(72) Inventors: Ju-Yeol Kong, Gyeonggi-do (KR); Gil-Ju Kim, Seoul (KR); Jung-Sang You, Gyeonggi-do (KR); Byeong-Seon Son, Gyeonggi-do (KR); Seon-Chae Na, Gyeonggi-do (KR); Chan-Ho Jung, Gyeonggi-do (KR); Dong-Hyun Kim, Gyeonggi-do (KR); Jun-Sik Hwang, Gyeonggi-do (KR); Hyoung-Jun Ham, Gyeonggi-do (KR)

(73) Assignees: Hyundai Motor Company, Seoul (KR); Kia Motors Corporation, Seoul (KR); Das Co., LTD, Yongin, Gyeonggi-do (KR)

( * ) Notice: Subject to any disclaimer, the term of this patent is extended or adjusted under 35 U.S.C. 154(b) by 0 days.

(21) Appl. No.: 16/168,489

(22) Filed: Oct. 23, 2018

(65) Prior Publication Data
US 2019/0291608 A1 Sep. 26, 2019

(30) Foreign Application Priority Data
Mar. 22, 2018 (KR) .......................... 10-2018-0033293

(51) Int. Cl.
*B60N 2/12* (2006.01)
*B60N 2/16* (2006.01)
(Continued)

(52) U.S. Cl.
CPC ............... *B60N 2/12* (2013.01); *B60N 2/165* (2013.01); *B60N 2/1615* (2013.01); *B60N 2/181* (2013.01);
(Continued)

(58) Field of Classification Search
CPC ........ B60N 2/12; B60N 2/1615; B60N 2/165; B60N 2/181; B60N 2/1814; B60N 2/1821;
(Continued)

(56) References Cited

U.S. PATENT DOCUMENTS 6,021,990 A 2/2000 Freund
10,358,052 B1 7/2019 Mizukoshi et al.
(Continued)

FOREIGN PATENT DOCUMENTS

CN 10-5358368 A 2/2016
DE 19914163 A1 10/2000
(Continued)

OTHER PUBLICATIONS

Extended European Search Report received for EP Patent Application No. 18205597.0, dated Jul. 29, 2019, 8 pages.

*Primary Examiner* — Mark R Wendell
(74) *Attorney, Agent, or Firm* — Mintz Levin Cohn Ferris Glovsky and Popeo, P.C.; Peter F. Corless

(57) ABSTRACT

A vehicle seat is configured to adjust a position of a seat cushion by a multi-bar link provided at each of both sides of the seat cushion, where the multi-bar link includes one seat cushion frame of a plurality of seat cushion frames forming both side frames of the seat cushion, and front and rear links pivotably connected to the respective front and rear of the one seat cushion frame. The vehicle seat includes a drive device configured to rotate the multi-bar link such that an end of the front link connected to the one seat cushion frame (Continued)

is lifted up and an end of the rear link connected to the one seat cushion frame is simultaneously moved down.

17 Claims, 34 Drawing Sheets

(51) Int. Cl.
 *B60N 2/68* (2006.01)
 *B60N 2/18* (2006.01)
(52) U.S. Cl.
 CPC ......... *B60N 2/1814* (2013.01); *B60N 2/1821* (2013.01); *B60N 2/1839* (2013.01); *B60N 2/1846* (2013.01); *B60N 2/1864* (2013.01); *B60N 2/68* (2013.01)
(58) Field of Classification Search
 CPC .. B60N 2/1839; B60N 2/1846; B60N 2/1864; B60N 2/68
 USPC .......................................................... 297/313
 See application file for complete search history.

(56) References Cited

U.S. PATENT DOCUMENTS

| | | | |
|---|---|---|---|
| 2009/0230752 A1 | 9/2009 | Adragna et al. | |
| 2011/0210586 A1 | 9/2011 | Masutani | |
| 2014/0159451 A1* | 6/2014 | Mollica | B60N 2/0284 297/284.11 |
| 2014/0361592 A1 | 12/2014 | Kuno | |
| 2018/0001793 A1 | 1/2018 | Pleskot | |
| 2019/0061568 A1 | 2/2019 | Hirata et al. | |
| 2019/0152352 A1 | 5/2019 | Handigol et al. | |
| 2019/0152357 A1* | 5/2019 | Harrison, III | B60N 2/3088 |
| 2019/0308527 A1 | 10/2019 | Nakamura et al. | |
| 2020/0009996 A1 | 1/2020 | Brodersen | |

FOREIGN PATENT DOCUMENTS

| | | |
|---|---|---|
| DE | 10113153 C1 | 4/2002 |
| DE | 102011122275 A1 | 6/2013 |
| DE | 102013101540 A1 | 8/2014 |
| DE | 102016015170 A1 | 6/2018 |
| EP | 0 575 243 A1 | 12/1993 |
| EP | 2 567 861 A1 | 3/2013 |
| FR | 2157671 A5 | 6/1973 |
| FR | 2901196 A1 | 11/2007 |
| FR | 2911817 A1 | 8/2008 |
| FR | 3058943 A1 | 5/2018 |
| GB | 1403897 A | 8/1975 |
| GB | 2018583 A | 10/1979 |
| JP | 2004-306923 A | 11/2004 |
| JP | 2006-001388 A | 1/2006 |
| JP | 2007-308050 A | 11/2007 |
| JP | 2009-227011 A | 10/2009 |
| JP | 2013-035517 A | 2/2013 |
| JP | 2017-019441 A | 1/2017 |
| KR | 2003-0049786 A | 6/2003 |
| KR | 101526979 B1 | 6/2015 |
| KR | 101557098 B1 | 10/2015 |
| KR | 2018-0005344 A | 1/2018 |
| WO | 2008/099538 A1 | 8/2008 |
| WO | 2012/036212 A1 | 3/2012 |
| WO | 2018/020836 A1 | 2/2018 |

* cited by examiner

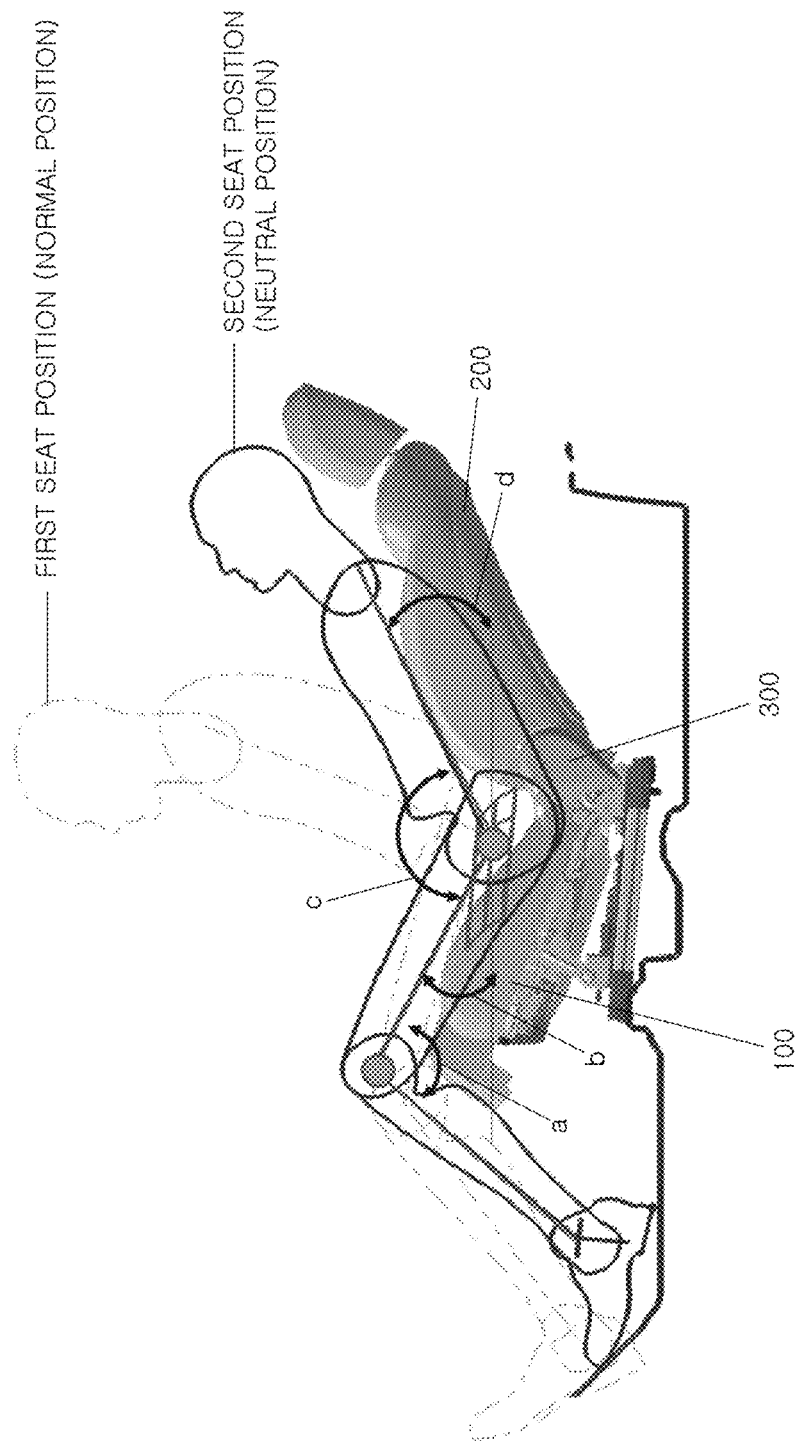

CONCENTRATED LOAD

CONCENTRATED LOAD

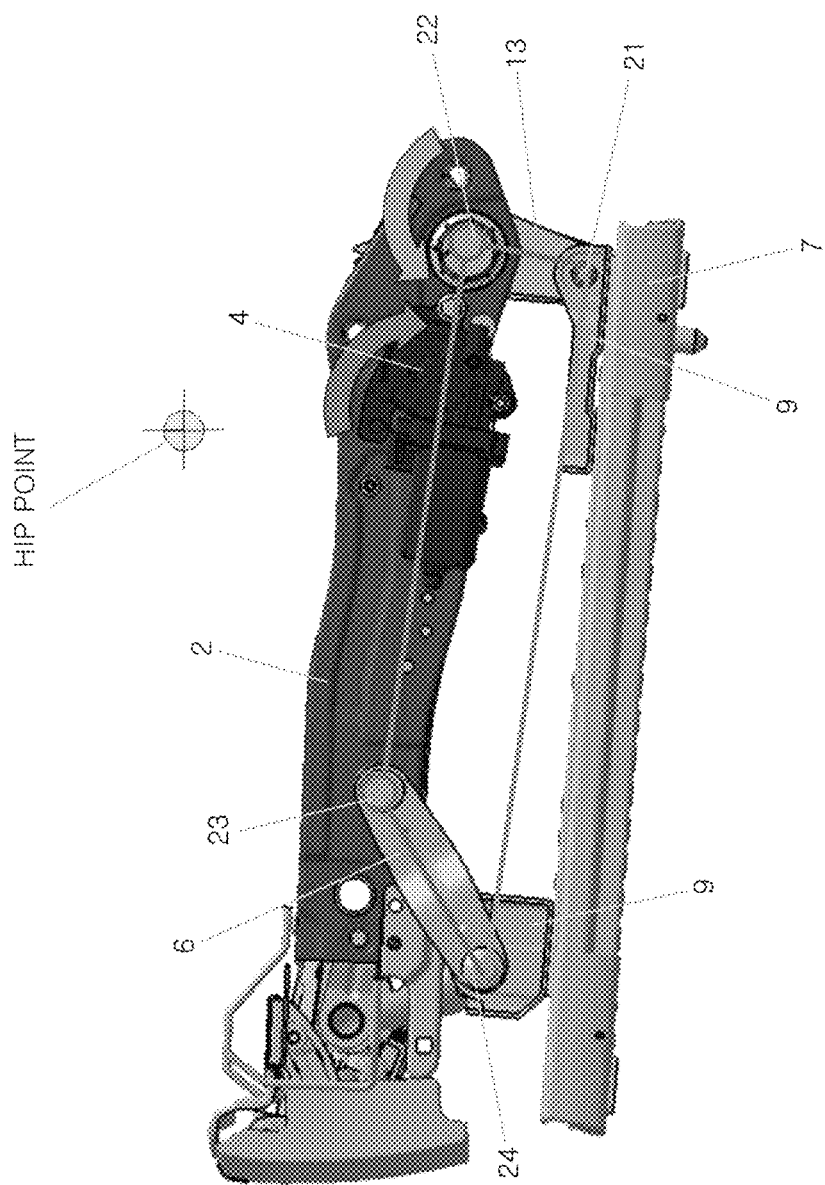

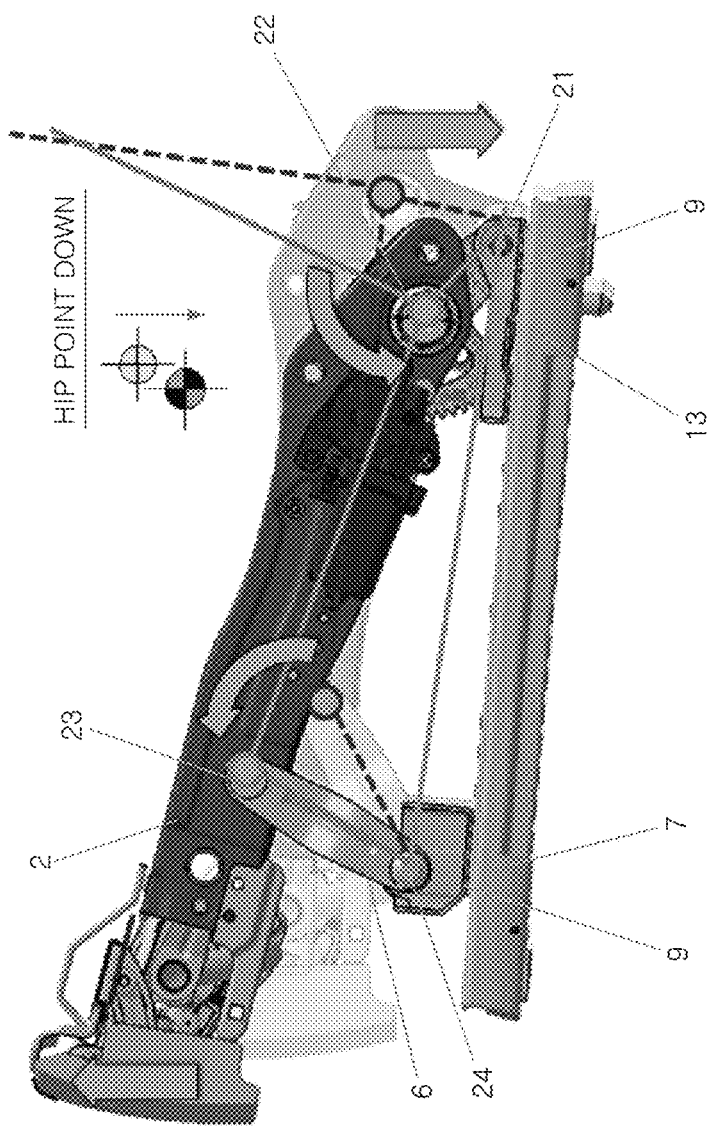

BEFORE OPERATION

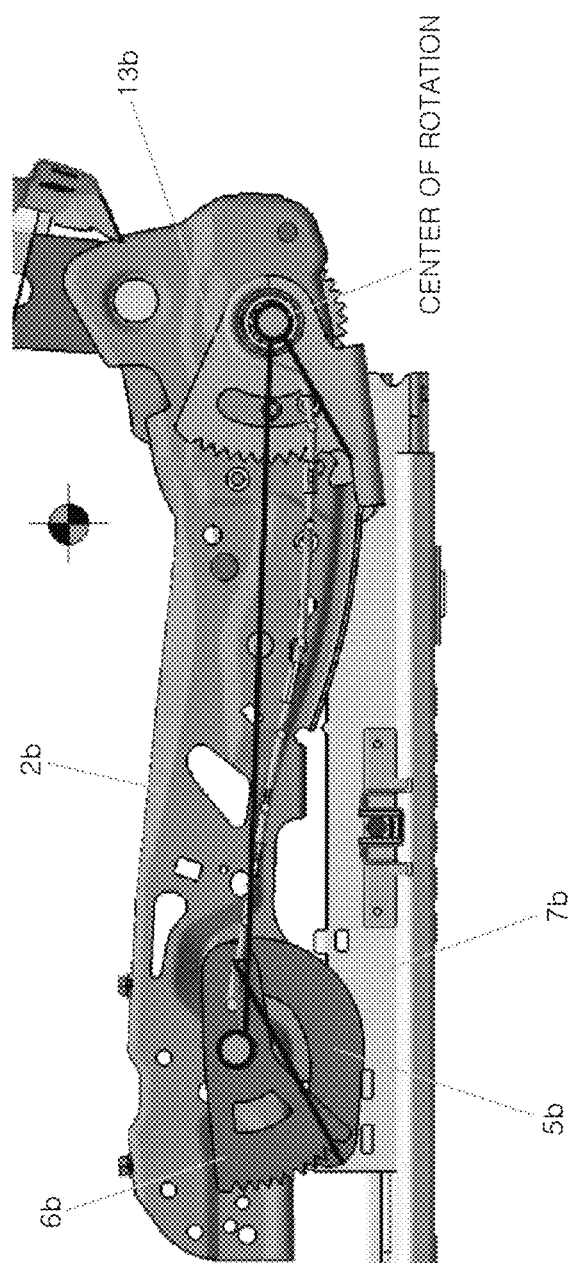

FIG.19A
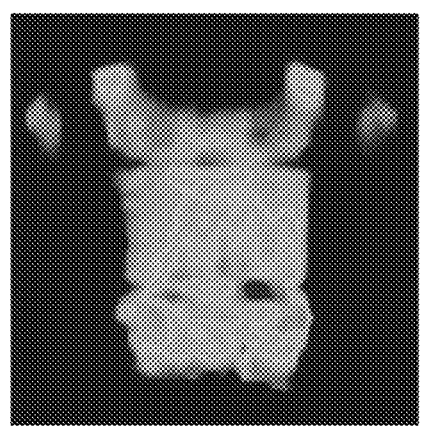
LOWER BODY    UPPER BODY

FIG.19B
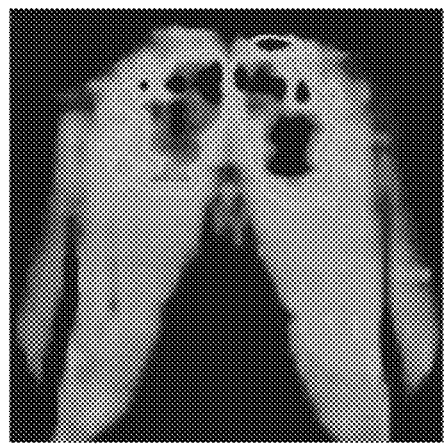
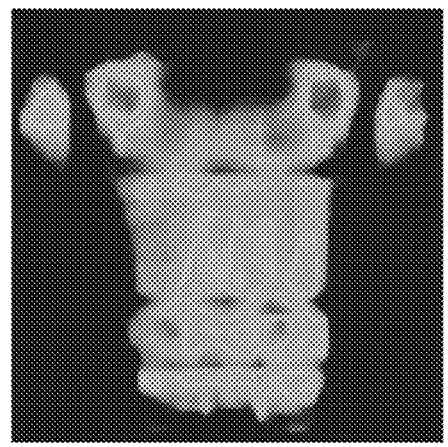
LOWER BODY          UPPER BODY

VEHICLE SEAT AND METHOD FOR CONTROLLING SITTING POSITION USING THE SAME

CROSS-REFERENCE TO RELATED APPLICATION(S)

This application claims under 35 U.S.C. § 119(a) the benefit of Korean Patent Application No. 10-2018-0033293, filed on Mar. 22, 2018, the entire contents of which are incorporated herein by reference.

BACKGROUND (a) Technical Field

The present disclosure relates to a vehicle seat and a method for controlling a sitting position using the same, more particularly, to the vehicle seat capable of implementing a neutral position for reducing fatigue at the time of driving.

(b) Description of Related Art

In general, a seat installed within a vehicle essentially includes a seat cushion 100 that touches the driver's and passenger's hips and a seat back 200 that touches the driver's or passenger's back, as illustrated in FIGS. 14 and 16. In addition to the essential components of the seat, the seat includes a seat lifter for adjusting the height of the seat cushion 100, e.g., as disclosed in Korean Patent Application Publication No. 10-2018-0005344, a tilting device to adjust the angle of the seat cushion 100, a seat adjustment device such as a recliner 300 to adjust the angle between the seat cushion 100 and the seat back 200, e.g., as disclosed in Korean Patent No. 10-1526979.

Meanwhile, in order for a driver to drive a vehicle, the driver sits down and grasps a steering wheel with both hands. If the driver drives the vehicle for a long time, a load is concentrated in the vicinity of the driver's lumbar vertebra and hips, causing blood pooling thereon. Accordingly, the driver may feel extreme fatigue in accompaniment with leg numbness and swelling and the like. A number of these symptoms occur especially in a human thigh with the slowest flow of blood. Further, it may cause back pain, a slipped disk, etc. due to the concentration of load on a specific portion when driving for a long time. Thus, there is an increasing need for a seat capable of implementing an optimal driving position to reduce fatigue by distributing the load concentrated on the specific portion of the human body at the time of driving and by lessening strain on joints and relaxing muscles even while driving for a long time.

Meanwhile, the neutral position illustrated in FIG. 13 is known as a type of position for reducing fatigue. The neutral position is the most comfortable position for the human body in a weightless environment, and it is known as a position for lessening strain on joints and balancing the human body by optimizing an angle between a calf and a thigh, an angle of the thigh to the ground, an upper/lower body angle between an upper body and a lower body, and an upper body's horizontal angle to the ground.

To implement a reduction in fatigue in the neutral position, a horizontal angle of the human thigh to the ground is especially important. The thigh's horizontal angle is a criterion when setting the upper/lower body angle and the upper body's horizontal angle because the slowest flow of human blood occurs in the thigh as described above. Accordingly, for the implementation of the neutral position, it is necessary to set the thigh's horizontal angle to be equal to or higher than at least 28° such that blood is able to smoothly flow in the thigh by increasing a difference in elevation.

However, when the seat height is adjusted to secure a driver's forward field of view according to the body type thereof in the conventional seat, both front and rear ends of the seat cushion 100 are simultaneously moved up or down, as illustrated in Korean Patent Application Publication No. 10-2018-0005344 and FIG. 14.

An apparatus for adjusting the height of a vehicle seat is illustrated in FIG. 15. The height of the vehicle seat illustrated in FIG. 15 is adjusted by pivoting a four-bar link that includes a seat cushion frame 2a, front and rear links 6a and 13a pivotably connected to respective front and rear ends of the seat cushion frame 2a, and a fixed part 7a for pivotably supporting the front and rear links 6a and 13a through a fixed part bracket 9a.

As illustrated in FIG. 15, when the four-bar link is pivoted, both of the seat cushion frame-side end of the front link 6a and the seat cushion frame-side end of the rear link 13a are simultaneously pivoted in the same direction (upward). Thus, both of the front and rear ends of the seat cushion 100 are lifted up. In this state, when the four-bar link is pivoted in the opposite direction again, both of the seat cushion frame-side end of the front link 6a and the seat cushion frame-side end of the rear link 13a are simultaneously pivoted in the same direction (downward). Thus, both of the front and rear ends of the seat cushion 100 are moved down.

Hence, it is impossible for the conventional seat height adjustment apparatus to implement the thigh's horizontal angle in the neutral position.

Meanwhile, when a tilting operation is performed to adjust the angle of the seat cushion 100 for increasing the support of the thigh during rapid braking of the vehicle, only the front end of the seat cushion 100 is lifted up or down, as illustrated in Korean Patent No. 10-1526979 and FIG. 16.

An apparatus for adjusting the height of this vehicle seat is illustrated in FIGS. 17A and 17B. The angle of the vehicle seat illustrated in FIG. 17A is adjusted by pivoting a five-bar link that includes a seat cushion frame 2b, a first front link 6b and a rear link 13b pivotably connected to respective front and rear ends of the seat cushion frame 2b, a second front link 35b, the other end of which is pivotably connected to a fixed part 7b, and the fixed part 7b for pivotably connecting the rear link 6b to the second front link 35b.

As illustrated in FIG. 17B, when the five-bar link is pivoted in the counterclockwise direction about the center of rotation of the rear link 13b, only the front end of the seat cushion frame 2b is lifted up. Thus, the height of the seat cushion 100 is generally moved up, with the consequence that the hip point of the driver is also moved up.

If the hip point is moved up when the seat cushion 100 is tilted, the variation of the thigh's horizontal angle is small compared to the level that the knee portion is moved up. Accordingly, if the tilting angle is forcedly increased to implement the neutral position, the driver's position is generally moved up, which may lead to a reduction in headroom and a knee space, as illustrated in FIG. 18A. Hence, it is impossible to substantially implement the neutral position illustrated in FIG. 13 because the seat cushion 100 is very restrictively tilted in a passenger vehicle such as a sedan having very limited headroom and knee space.

SUMMARY

An embodiment of the present disclosure is directed to a vehicle seat capable of implementing a neutral position for reducing fatigue at the time of driving, and a method for controlling a sitting position using the same.

In accordance with an embodiment of the present disclosure, a vehicle seat is configured to adjust a position of a seat cushion and includes a seat cushion driving device to lift up a front end of the seat cushion positioned in a longitudinal direction of a vehicle and simultaneously moving down a rear end thereof such that the seat is moved from a first seat position, which is a basic position when an occupant is seated in the vehicle, to a second seat position at which a thigh angle of the occupant to a horizontal direction of the vehicle is a predetermined angle.

To implement a neutral position for reducing fatigue, the seat cushion driving device may adjust the position of the seat cushion such that the thigh angle is 28° to 32°.

In order for an angle between upper and lower bodies to be formed to implement the neutral position for reducing fatigue, the vehicle seat may further include a recliner for adjusting a position of a seat back to the seat cushion, and the recliner may adjust the position of the seat back such that an upper/lower body angle between upper and lower bodies of the occupant is 105° to 125° in a state in which the thigh angle is maintained in the above range.

The recliner may adjust an upper body angle of the occupant to the horizontal direction of the vehicle in a predetermined range so as to secure a forward field of view of the occupant in a state in which the thigh angle and the upper/lower body angle of the occupant are maintained in the above range.

To sufficiently secure the forward field of view, the upper body angle of the occupant to the horizontal direction of the vehicle may be 32° to 47°.

In accordance with another embodiment of the present disclosure, a vehicle seat is configured to adjust a position of a seat cushion by a multi-bar link provided at each of both sides of the seat cushion, the multi-bar link includes one seat cushion frame of a plurality of seat cushion frames forming both side frames of the seat cushion, and front and rear links pivotably connected to the respective front and rear of the one seat cushion frame, and the vehicle seat includes a drive device configured to rotate the multi-bar link such that an end of the front link connected to the one seat cushion frame is lifted up and an end of the rear link connected to the one seat cushion frame is simultaneously moved down.

The multi-bar link may be a four-bar link including the one seat cushion frame, the front link, the rear link, and a fixed part positioned beneath the one seat cushion frame and pivotably connected to the front and rear links, and the drive device may include a drive source gear provided at the one seat cushion frame, one end of the drive source gear being connected to a rotatable drive source, and a rear link gear provided at the rear link to engage with the drive source gear, the rear link gear allowing the multi-bar link to rotate by rotation of the drive source gear.

To lift up the front end of the seat cushion and simultaneously move down the rear end thereof for implementation of a neutral position, an angle formed by the rear link and an imaginary vertical line in an initial position before the rear link is rotated by the drive device, when viewed from the side of a vehicle, may be less than or equal to ⅓ of an angle formed by the rear link and the vertical line when the rear link is rotated forward of the vehicle by the drive device.

To prevent forward collapse of the link due to forward collision of the vehicle, the angle formed by the rear link and the imaginary vertical line in the initial position before the rear link is rotated by the drive device may be within ±10° with respect to the vertical line.

To prevent cushion deflection due to a load, the seat cushion frames may include an inner seat cushion frame and an outer seat cushion frame, and the drive device may be provided at the outer seat cushion frame, and the rear link pivotably connected to the inner seat cushion frame may have a stopper for restricting a driving range of the four-bar link.

The stopper may include a guide hole formed between one end and the other end of the rear link to pass through both sides thereof, and a guide pin protruding from one side of the inner seat cushion frame to be inserted into the guide hole, the guide pin restricting the rotation of the rear link by contact with the guide hole when the rear link rotates.

The stopper may have a touch surface, which touches a fixed part bracket disposed to the fixed part to support the rear link, to restrict the rotation of the rear link.

To adjust the position of the seat cushion for implementation of the neutral position, the multi-bar link may be a four-bar link including the one seat cushion frame, the front link, the rear link, and a fixed part positioned beneath the one seat cushion frame and pivotably connected to the front and rear links, one end of the front link and one end of the rear link may be connected to the fixed part so as to slide in a longitudinal direction of a vehicle through respective front and rear guides, and the drive device may rotate the one seat cushion frame about a predetermined point between both ends of the one seat cushion frame.

The drive device may include a drive source gear, one end of which is connected to a rotatable drive source, and a seat cushion frame gear provided at the one seat cushion frame to engage with the drive source gear, the seat cushion frame gear allowing the multi-bar link to rotate by rotation of the drive source gear.

A pin formed at one end of the front link and a pin formed at one end of the rear link may be respectively provided at the front guide and the rear guide to be inserted into respective guide holes extending in the longitudinal direction of the vehicle, thereby being connected to the fixed part so as to be slidable along the guide holes in the longitudinal direction of the vehicle.

To move down a hip point for implementation of the neutral position, in an initial position before the drive device is driven, an imaginary segment extending to a hip point of an occupant from the point as a center of rotation, when viewed from the side of the vehicle, may be positioned rearward of the vehicle compared to an imaginary vertical line extending vertically from the point.

To move down the hip point for implementation of the neutral position, when viewed from the side of the vehicle, an angle formed by an imaginary vertical line extending vertically from the point and an imaginary segment extending between the point and a hip point of an occupant after the drive device is driven may be greater than an angle formed by the vertical line and an imaginary segment extending between the point and a hip point of an occupant before the drive device is driven.

In the multi-bar link to adjust the position of the seat cushion for implementation of the neutral position, the rear link may include a first rear link pivotably connected to the one seat cushion frame, and a second rear link, one end of which is connected to the first rear link while the other end thereof is connected to a fixed part positioned beneath the one seat cushion frame so as not to pivot, the multi-bar link may be a five-bar link including the one seat cushion frame, the front link, the first rear link, the second rear link, and the fixed part pivotably connected to the front link, and the drive device may include a drive source gear, one end of which is connected to a rotatable drive source, and a rear link gear provided at the first rear link to engage with the drive source gear, the rear link gear allowing the five-bar link to rotate by rotation of the drive source gear.

In the multi-bar link to adjust the position of the seat cushion for implementation of the neutral position, the rear link may include a first rear link pivotably connected to the one seat cushion frame, and a second rear link, one end of which is selectively pivotably connected to the first rear link while the other end thereof is selectively pivotably connected to a fixed part positioned beneath the one seat cushion frame, the multi-bar link may be a five-bar link including the one seat cushion frame, the front link, the first rear link, the second rear link, and the fixed part pivotably connected to the front link, the drive device may include a drive source gear, one end of which is connected to a rotatable drive source, and a rear link gear provided at the first rear link to engage with the drive source gear, the rear link gear allowing the five-bar link to rotate by rotation of the drive source gear, when the seat cushion is tilted, a connection between the second rear link and the fixed part may be switched so as not to pivot and a connection between the first rear link and the second rear link may be swichted so as to pivot, and when a height of the seat cushion is adjusted, the connection between the second rear link and the fixed part may be switched so as to pivot and the connection between the first rear link and the second rear link may be swichted so as not to pivot.

The rotatable drive source may be an electric motor or a pumping lever manually operated.

In accordance with another embodiment of the present disclosure, a method for controlling a sitting position using a vehicle seat configured to adjust a position of a seat cushion includes lifting up a front end of the seat cushion positioned in a longitudinal direction of a vehicle and simultaneously moving down a rear end thereof such that the seat is moved from a first seat position, which is a basic position when an occupant is seated in the vehicle, to a second seat position at which a thigh angle of the occupant to a horizonal direction of the vehicle is a predetermined angle.

To implement the thigh angle in a neutral position, the position of the seat cusion may be adjusted such that the thigh angle is 28° to 32°.

To implement an upper/lower body angle in the neutral position, a position of a seat back may be adjusted such that an upper/lower body angle between upper and lower bodies of the occupant is 105° to 125° in a state in which the thigh angle is maintained in the above range.

An upper body angle of the occupant to the horizontal direction of the vehicle may be adjusted in a predetermined range so as to secure a forward field of view of the occupant in a state in which the thigh angle and the upper/lower body angle of the occupant are maintained in the above range.

To sufficiently secure the forward field of view, the upper body angle of the occupant to the horizontal direction of the vehicle may be 32° to 47°.

BRIEF DESCRIPTION OF THE DRAWINGS

FIG. 1 is a side view illustrating a driver's sitting position in a first seat position (normal position) and a second seat position (neutral position) of a vehicle seat according to the present disclosure.

FIG. 6A is a side view illustrating a perimeter of an outer seat cushion frame of a vehicle seat when viewed from the outside before driving by a drive device according to an embodiment of the present disclosure.

FIG. 6B is a side view illustrating a perimeter of the outer seat cushion frame of the vehicle seat when viewed from the outside after driving by the drive device according to the embodiment of the present disclosure.

FIGS. 17A and 17B (RELATED ART) are side views illustrating a perimeter of the outer seat cushion frame of the conventional vehicle seat when viewed from the outside in the case of tilting the seat.

FIG. 19A is a view illustrating distribution of the load applied to a driver's lower body in the normal position of FIG. 1.

FIG. 19B is a view illustrating distribution of the load applied to the driver's lower body in the neutral position of FIG. 1.

DESCRIPTION OF SPECIFIC EMBODIMENTS

Figure 2A:
FIG. 2A is a view illustrating distribution of the load applied to an occupant's lower body when a thigh's horizontal angle (b) is 17°.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Hereinafter, a vehicle seat and a method for controlling a sitting position using the same according to exemplary embodiments of the present disclosure will be described with reference to the accompanying drawings.

FIG. 1 is a side view illustrating a driver's sitting position in a first seat position (normal position) and a second seat position (neutral position) of a vehicle seat according to the present disclosure.

As illustrated in FIG. 1, the vehicle seat essentially includes a seat cushion 100 that touches a driver's or passenger's hips and a seat back 200 that touches a driver's or passenger's back. The thigh's horizontal angle (b), upper/lower body angle (c), and upper body's horizontal angle (d) of an occupant for determining a sitting position are determined by an angle of inclination of the seat cushion 100 to the horizontal plane, an angle of inclination of the seat back 200 to the seat cushion 100, and thus an angle of inclination between the seat back 200 and the horizontal plane. The angle between a thigh and a calf is individually determined according to the body type of the occupant.

The angle of inclination of the seat cushion 100 is adjusted by a device for adjusting the position of the seat cushion 100 illustrated in FIGS. 6A, 6B, 10A, 10B, and 12A to 12C. The angle of inclination of the seat back 200 to the seat cushion 100 is adjusted by a recliner 300. However, any known recliner may also be used as long as it adjusts the angle of inclination of the seat back 200 to the seat cushion 100.

The first seat position (normal position) is a seat position when the occupant is seated in the vehicle and refers to a basic seat position before the position of the seat cushion 100 or the seat back 200 is adjusted. Examples of the thigh's horizontal angle (b), upper/lower body angle (c), and upper body's horizontal angle (d) of the occupant in the first seat position are indicated in the following Table 1. The angles indicated in Table 1 are merely preferred examples, and the first seat position implemented by the vehicle seat according to the present disclosure is not limited to the angles indicated in Table 1. There may be a slight difference depending on the type of the vehicle.

TABLE 1

|  | Thigh's horizontal angle | Upper/lower body angle | Upper body's horizontal angle |
| --- | --- | --- | --- |
| Normal position | 17° | 95° | 68° |
| Neutral position | 28°~32° | 105°~120° | 32°~47° |

The second seat position refers to a seat position that allows the sitting position of the occupant to be a weightless neutral position for reducing fatigue by adjusting the positions of the seat cushion 100 and the seat back 200. As illustrated in FIG. 1, the present disclosure implements the neutral position by lifting up the front end of the seat cushion 100 positioned in the longitudinal direction of the vehicle and simultaneously moving down the rear end thereof to move up the knee joint of the occupant and simultaneously move down the hip point thereof. In this case, it is possible to effectively implement the neutral position even in the vehicle having a limited knee space and headroom.

The preferable range of the thigh's horizontal angle (b), upper/lower body angle (c), and upper body's horizontal angle (d) of the occupant in the second seat position is the same as indicated in Table 1. Hereinafter, the neutral position implemented in the second seat position will be described.

In the neutral position, the thigh's horizontal angle (b) is the most important. This is because of obtaining the largest fatigue reduction by adjusting the thigh's horizontal angle (b) and acting as a criterion at the time of setting the upper/lower body angle (c) and the upper body's horizontal angle (d). Accordingly, it is necessary to implement the thigh's horizontal angle (b) as high as possible in order to implement the neutral position. To this end, the present disclosure can implement an intended range of the thigh's horizontal angle (b) by lifting up the front end of the seat cushion 100 positioned in the longitudinal direction of the vehicle and simultaneously moving down the rear end thereof to move up the knee joint of the occupant and simultaneously move down the hip point thereof, as described above.

Meanwhile, the preferred range of the thigh's horizontal angle (b) is 28° to 32° as indicated in Table 1. If the thigh's horizontal angle is too low, a load is concentrated in the vicinity of hips during driving a long distance, causing blood pooling thereon. On the other hand, if the thigh's horizontal angle is too high, a load is concentrated on a knee or a calf, causing blood pooling thereon. Thus, when the angle of inclination of the seat cushion 100 is adjusted such that the thigh's horizontal angle (b) is 28° to 32°, blood smoothly flows by an appropriate difference in elevation, thereby enabling leg numbness or swelling to be suppressed during driving a long distance.

Figure 2B:
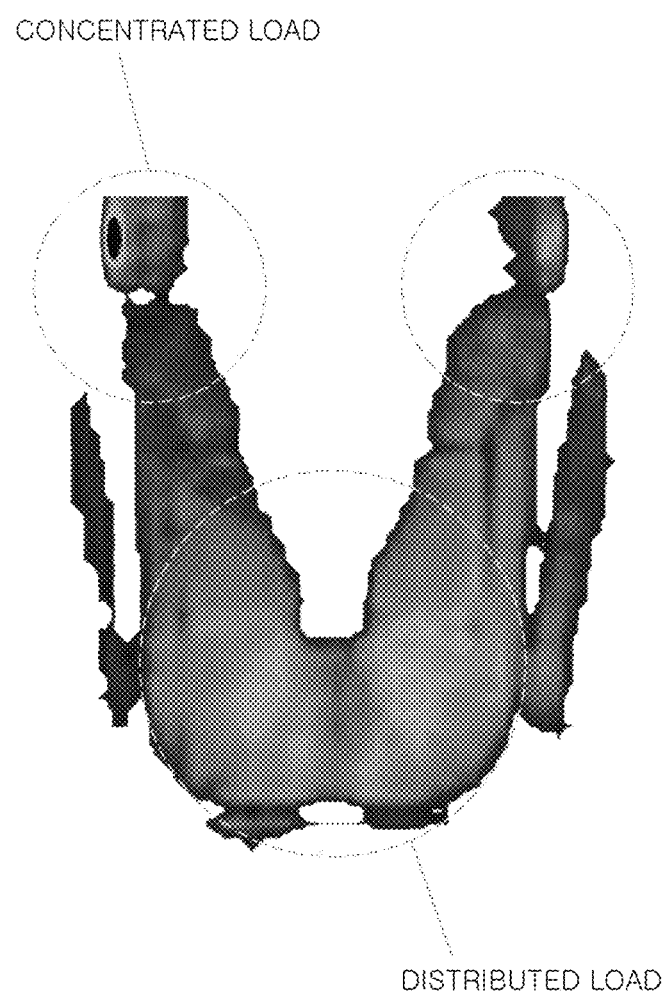
FIG. 2B is a view illustrating distribution of the load applied to the occupant's lower body when the thigh's horizontal angle (b) is 33°.

FIG. 2A is a view illustrating distribution of the load applied to the occupant's lower body when the thigh's horizontal angle (b) is 17°. In FIG. 2A, it can be seen that a load is concentrated in the vicinity of the hips because the thigh's horizontal angle is too low. FIG. 2B is a view illustrating distribution of the load applied to the occupant's lower body when the thigh's horizontal angle (b) is 33°. In FIG. 2B, it can be seen that when the thigh's horizontal angle is high, the load concentrated on the hips is distributed but the load is concentrated on the calf again. FIG. 19B is a view illustrating distribution of the load applied to the driver's lower body in the neutral position indicated in Table 1. In FIG. 19B, it can be seen that, in the neutral position implemented using the vehicle seat according to the present disclosure, the load concentrated on the hips in an example of FIG. 2A is distributed and the load concentrated on the calf in an example of FIG. 2B is effectively distributed.

The upper/lower angle (c) is an angle formed by the thigh and upper body of the occupant when the occupant is seated on the vehicle seat. In the neutral position implemented using the vehicle seat according to the present disclosure, the upper/lower angle (c) is set on the basis of the thigh's horizontal angle (b), and is accomplished by adjusting the angle of inclination of the seat back 200 using the recliner 30.

The preferred range of the upper/lower angle (c) is 105° to 125° as indicated in Table 1. By limiting the upper/lower angle (c) to the above range, it is possible to evenly distribute the load to the upper end of the back to relieve the pain of a lumbar vertebra and to relax shoulder muscles. Since a load is concentrated on the lumbar vertebra if the upper/lower angle (c) is too low, the upper/lower angle (c) preferably exceeds at least 95°. In addition, since a load is concentrated on the intermediate end of the back if the upper/lower angle (c) is too high, the upper/lower angle (c) is preferably less than 130°. If the upper/lower angle is too high, the support area of the upper and lower bodies may be reduced. Thus, it is necessary to set the range of the upper/lower angle based on the angle at which the support area of the upper and lower bodies is the largest. Therefore, the preferred range of the upper/lower angle (c) is 105° to 125° when generally considering these cases.

Figure 3A:
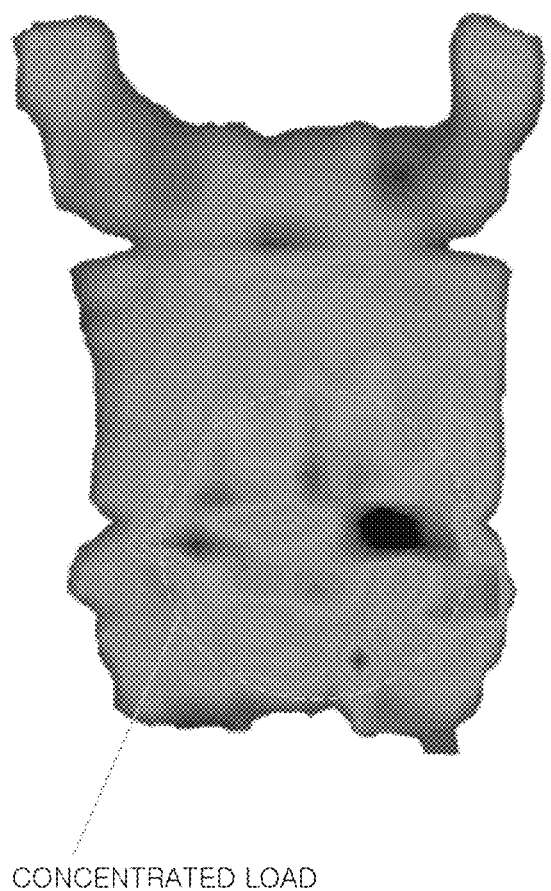
FIG. 3A is a view illustrating distribution of the load applied to a driver's upper body when an upper/lower body angle is 95°.
Figure 3B:
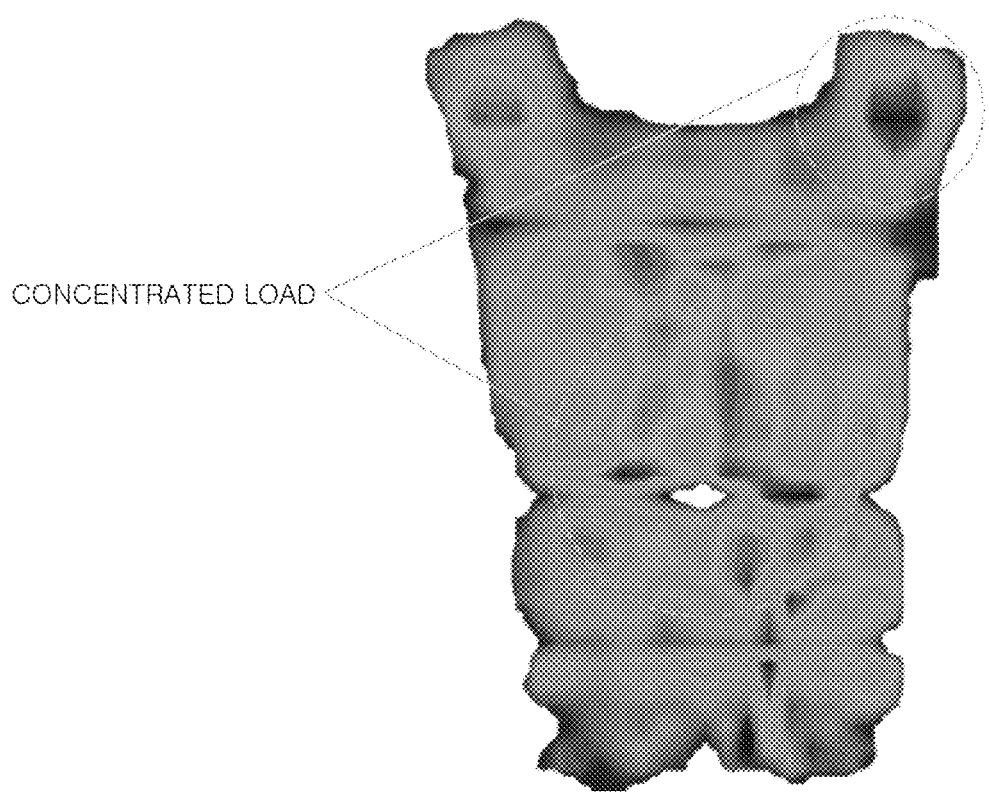
FIG. 3B is a view illustrating distribution of the load applied to the driver's upper body when the upper/lower body angle is 130°.

FIG. 3A is a view illustrating distribution of the load applied to the driver's upper body when the upper/lower body angle (c) is 95°. In FIG. 3A, it can be seen that a load is concentrated on the lumbar vertebra since the upper/lower body angle (c) is too low. FIG. 3B is a view illustrating distribution of the load applied to the driver's upper body when the upper/lower body angle is 130°. In FIG. 3B, it can be seen that a load is concentrated on the intermediate end of the back since the upper/lower body angle (c) is too high. FIG. 19B is a view illustrating distribution of the load applied to the driver's upper body in the neutral position indicated in Table 1. In FIG. 19B, it can be seen that, in the neutral position implemented using the vehicle seat according to the present disclosure, the load concentrated on the lumbar vertebra and the back is effectively distributed.

Figure 4:
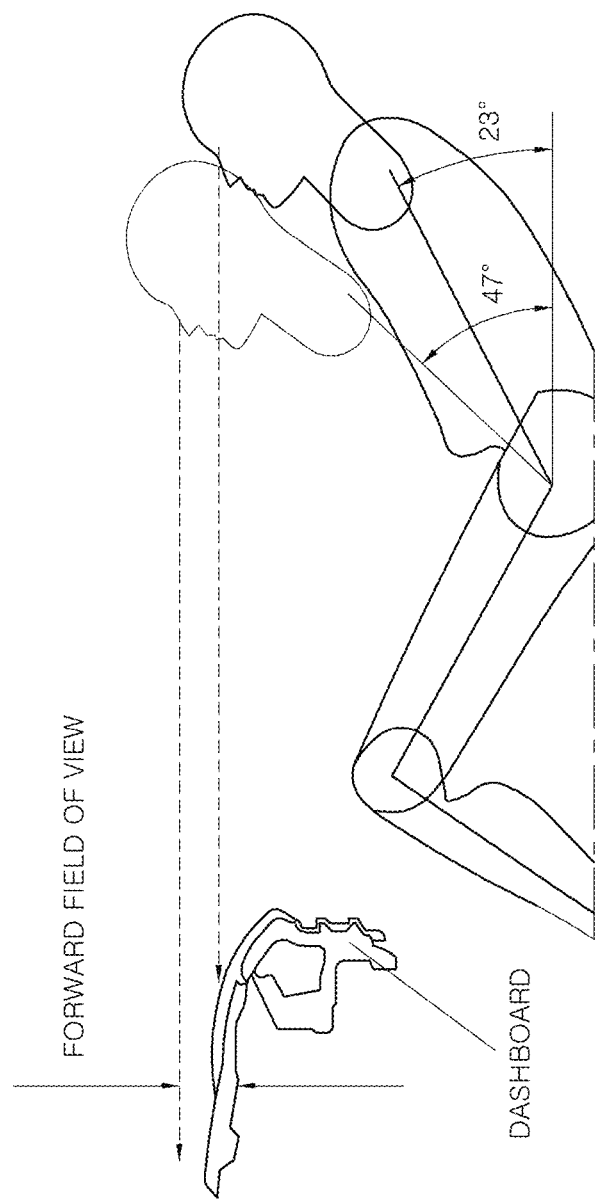
FIG. 4 is a view illustrating a driver's forward field of view in the normal and neutral positions of FIG. 1.

The upper body's horizontal angle (d) is a value obtained by limiting the thigh's horizontal angle (b) and the upper/lower body angle (c). Accordingly, when the thigh's horizontal angle (b) and the upper/lower body angle (c) are determined, the upper body's horizontal angle (d) is determined by calculation. However, a driver's forward field of view may vary depending on the upper body's horizontal angle (d), as illustrated in FIG. 4. Therefore, it is necessary to determine the upper body's horizontal angle (d) so as to sufficiently secure a forward field of view.

For example, as illustrated in FIG. 4, it is possible to sufficiently secure a forward field of view when the upper body's horizontal angle (d) is 47°, but it is difficult to secure the forward field of view when the upper body's horizontal angle (d) is 23°. Since the forward field of view is associated with the body condition of the driver and the height of the vehicle dashboard, it is necessary to adjust the recliner 300 such that the upper body's horizontal angle (d) is properly set when the neutral position is set.

The preferred range of the upper body's horizontal angle (d) is 32° to 47° as indicated in Table 1. If the upper body's horizontal angle (d) is the above range, 95% of passengers may have a good forward field of view. Thus, the gradient of the seat back 200 is adjusted by adjusting the recliner 300 such that the upper body's horizontal angle (d) is 32° to 47° within the limit that the thigh's horizontal angle and the upper/lower body angle (c) of the driver are in the preferred range indicated in Table 1. Although the preset upper/lower body angle (c) is changed in this process, it is necessary to determine the upper body's horizontal angle (d) such that the changed upper/lower body angle (c) is still in the preferred range indicated in Table 1. The value of the upper body's horizontal angle (d) may be determined in advance according to the specification of the vehicle applied thereto and be stored in the memory device of the vehicle.

The following Table 2 indicates a result obtained by measuring a maximum body pressure and a pressure distribution area applied to the driver seated in each of the first and second seat positions indicated in Table 1. As seen in Table 2, when the driver is seated in the second seat position as the neutral position, the maximum body pressure may be decreased to 25% and the pressure distribution area may be increased to 18%. As seen from this result, when the vehicle seat according to the present disclosure is used, it is possible to evenly distribute the load applied to the driver during driving over a wider range and to smoothly supply blood to a heart and a brain without pooling of blood due to the concentrated load. In addition, when the vehicle seat according to the present disclosure is used, it is possible to press the hips against the seat and to suppress a waist pain and a slipped disk caused during driving a long distance by preventing spinal twist.

TABLE 2

|  | First seat position (normal position) | Second seat position (neutral position) |
|---|---|---|
| Maximum body pressure | 2.16 N/cm$^2$ | 1.62 N/cm$^2$ |
| Distribution area | 2567 cm$^2$ | 3027 cm$^2$ |

In accordance with the vehicle seat and the method for controlling a sitting position using the same of the present disclosure, it is possible to effectively implement the neutral position capable of reducing fatigue during driving even in the limited space of the vehicle.

FIGS. 6A and 6B illustrate a structure of a seat cushion frame forming a frame of a seat cushion 100 of a vehicle seat according to a preferred embodiment of the present disclosure. FIG. 6A is a side view illustrating a perimeter of an outer seat cushion frame of a vehicle seat when viewed from the outside before driving by a drive device according to an embodiment of the present disclosure. FIG. 6B is a side view illustrating a perimeter of the outer seat cushion frame of the vehicle seat when viewed from the outside after driving by the drive device according to the embodiment of the present disclosure.

As illustrated in FIGS. 6A and 6B, the seat cushion frames forming the left and right frames of a seat cushion 100 include an outer seat cushion frame 2 and an inner seat cushion frame. The outer seat cushion frame 2 and the inner seat cushion frame are connected to each other through a hinge pipe 10 so that both movements are synchronized with each other. A cushion panel 110 is coupled to the outer and inner seat cushion frames 2 and 3 so as to be movable in the longitudinal direction of the seat while pivoting by the hinge of the outer and inner seat cushion frames 2 and 3, and the cushion panel 110 and both seat cushion frames 2 and 3 are covered with the seat cushion 100 made of a material such as urethane foam.

Figure 5A:
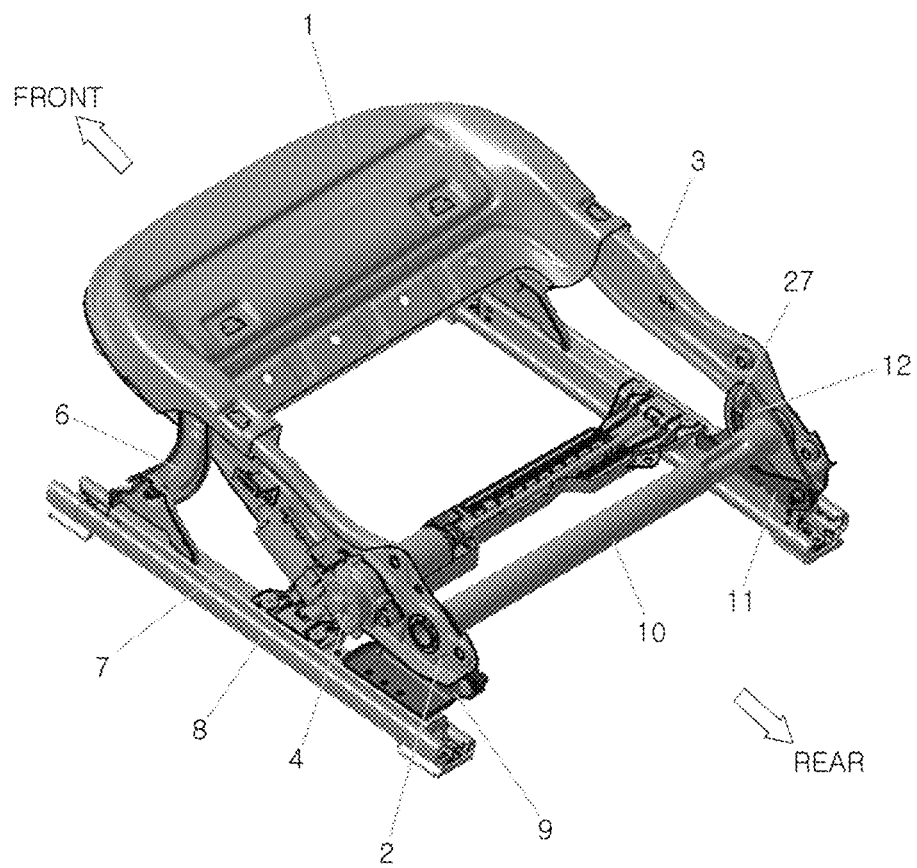
FIG. 5A is a rear-left perspective view illustrating seat cushion frames of the vehicle seat according to the present disclosure.
Figure 5B:
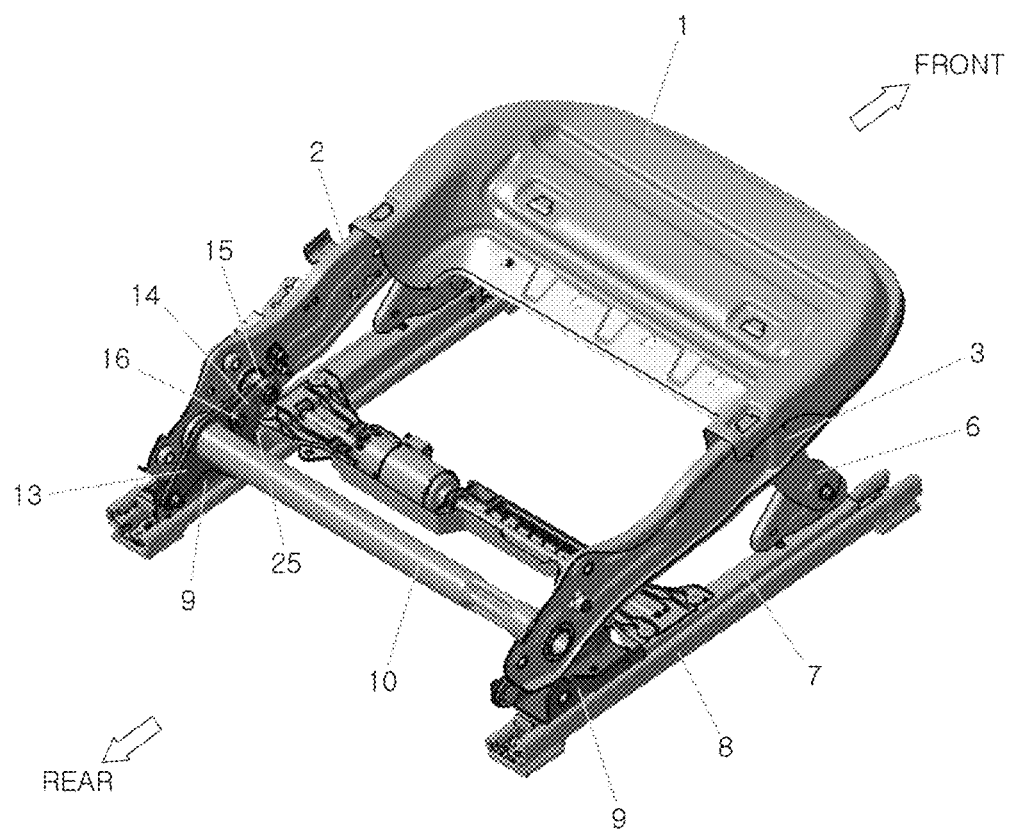
FIG. 5B is a rear-right perspective view illustrating the seat cushion frames of the vehicle seat according to the present disclosure.
Figure 8A:
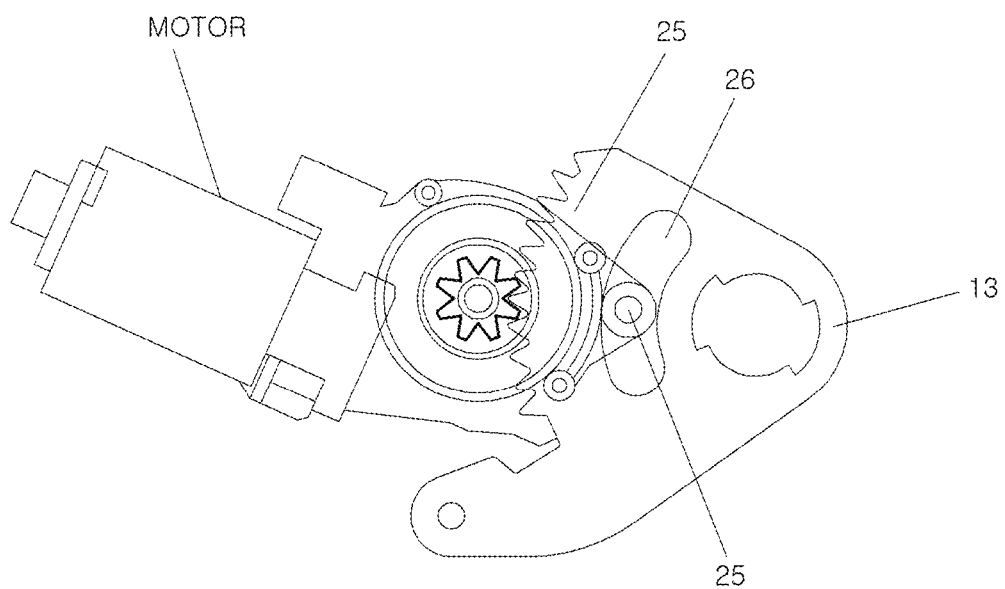
FIG. 8A is a view illustrating one configuration of a drive device used for a vehicle seat according to a preferred embodiment of the present disclosure.
Figure 8B:
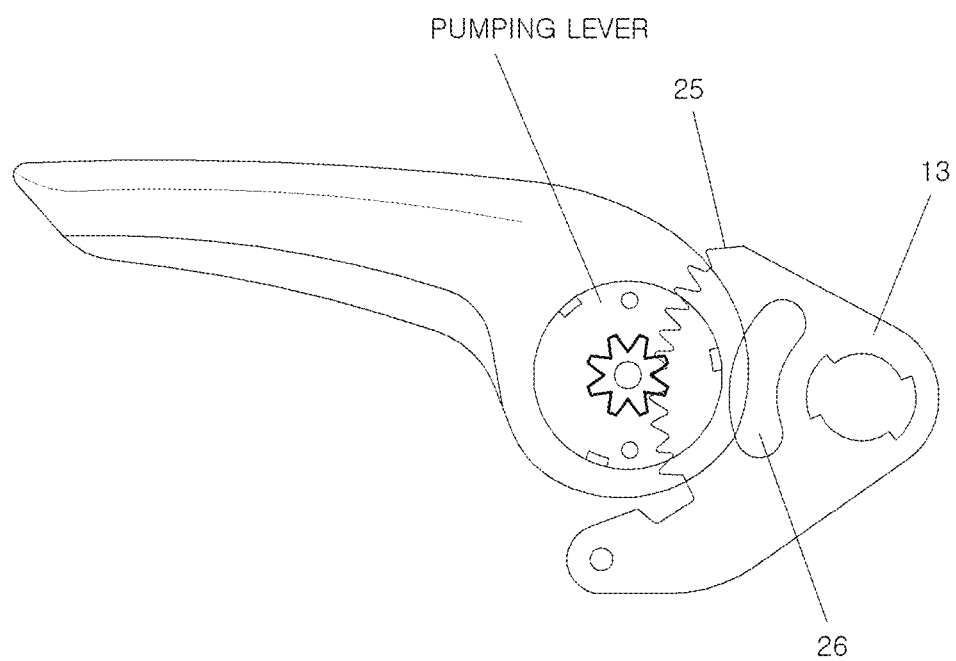
FIG. 8B is a view illustrating another configuration of the drive device used for the vehicle seat according to the preferred embodiment of the present disclosure.

To tilt the seat cushion 100 for adjusting the position thereof, four-bar links are formed that include front links 6 and rear links 12 and 13 pivotably connected to the respective front and rear of the outer and inner seat cushion frames 2 and 3, and fixed parts 7 positioned beneath the outer and inner seat cushion frames 2 and 3 to be pivotably connected to the front links 6 and the rear links 12 and 13, and each has a parallelogram shape when viewed from the side in examples of FIGS. 5A and 5B. The seat includes a drive source 4 that pivots the four-bar links to adjust the position of the seat cushion 100. The drive source 4 may be an electric motor as illustrated in FIG. 8A, or may be a pumping lever that transmits power by driver's manual operation as illustrated in FIG. 8B.

In particular, the front links 6 are arranged one by one to the left and right of the seat cushion 100 and are pivotably connected to respective front ends of the outer and inner seat cushion frames 2 and 3 positioned in the longitudinal direction of the vehicle. As illustrated in FIG. 5A, the upper portions of the front links 6 are inclined rearward of the vehicle compared to the lower portions thereof before the four-bar links are pivoted by the drive source 4.

The rear links 12 and 13 include an inner seat cushion frame-side rear link 12 and an outer seat cushion frame-side rear link 12 such that respective ends thereof are pivotably connected to the inner and outer seat cushion frames 3 and 2. The lower ends of the rear links 12 and 13 are pivotably connected to the fixed parts 7 through fixed part brackets 9, respectively. Similar to the front links 6, the upper portions of the rear links 12 and 13 are inclined rearward of the vehicle compared to the lower portions thereof before the four-bar link is pivoted by the drive source 4.

In the embodiment illustrated in FIG. 5A, the rear links 12 and 13 are axially supported by the hinge pipe 10 connecting the outer seat cushion frame 2 and the inner seat cushion frame 3. Thus, the left and right rear links 12 and 13 are pivotably connected to the inner and outer seat cushion frames 3 and 2 while rotating by interlocking.

In the embodiment illustrated in FIG. 5B, a rear link gear 25 is formed at the outer seat cushion frame-side rear link 13. The rear link gear 25 engages with a drive source gear 15 that is provided at one end of the rotary shaft of the drive source 4 to coaxially rotate together with the rotary shaft. Thus, when the drive source gear 15 is rotated counterclockwise by the rotational power of the drive source 4, the rear links 12 and 13 are pivoted forward and upward of the vehicle along with the rotation of the rear link gear 25 engaged with the drive source gear 15. Since the seat cushion frames 2 and 3 and the front links 6 form the four-bar links together with the rear links 12 and 13, they are pivoted by interlocking along with the rotation of the rear links 12 and 13. As a result, the front links 6 begin to pivot forward and upward of the vehicle, thereby changing the positions of the seat cushion frames 2 and 3, namely the position of the seat cushion 100.

The fixed parts 7 form a portion of the four-bar links and serve to fix the four-bar links to the vehicle body. In the embodiment illustrated in FIGS. 5A and 5B, each of the fixed parts 7 is a movable rail and is slidably coupled to a fixed rail 8 that fixedly extends in the longitudinal direction of the vehicle. Consequently, it is possible to move the seat in the longitudinal direction of the vehicle.

To implement the neutral position using the vehicle seat according to the embodiment of the present disclosure, a mechanism for adjusting the position of the seat cushion 100 will be described below in detail with reference to the accompanying drawings.

FIG. 6A is a side view illustrating the perimeter of the outer seat cushion frame of the vehicle seat when viewed from the outside before driving by the drive device according to the embodiment of the present disclosure.

As illustrated in FIG. 6A, the vehicle seat according to the preferred embodiment of the present disclosure includes the four-bar links that include the seat cushion frames 2 and 3, the front links 6, the rear links 12 and 13, and the fixed parts 7 positioned beneath the seat cushion frames 2 and 3 to be pivotably connected to the front links 6 and the rear links 12 and 13, and the drive source 4 as a drive device for driving the four-bar links. The drive source 4 is installed to the outer seat cushion frame 2. The drive source 4 may be an electric motor as illustrated in FIG. 8A, or may be a pumping lever that transmits power by driver's manual operation as illustrated in FIG. 8B. Although the outer seat cushion frame 2 of the left and right seat cushion frames 2 and 3 and the four-bar link including the same are illustrated in FIG. 6A, a four-bar link and an inner seat cushion frame 2 corresponding to those illustrated in FIG. 6A are present. Thus, repeated description related to the same will be omitted.

As illustrated in FIG. 6A, the upper end of the front link 6 is axially supported by the pin 23 to be pivotably connected to the front end of the outer seat cushion frame 2 positioned in the longitudinal direction of the vehicle. The lower end of the front link 6 is axially supported by the pin 24 to be pivotably connected to the fixed bracket 9 of the fixed part 7. The upper portion of the front link 6 is inclined rearward of the vehicle compared to the lower portion thereof before the four-bar link is pivoted by the drive source 4.

The upper end of the rear link 13 is axially supported by the pin 22 to be pivotably connected to the rear end of the outer seat cushion frame 2 positioned in the longitudinal direction of the vehicle. The lower end of the rear link 13 is axially supported by the pin 21 to be pivotably connected to the fixed bracket 9 of the fixed part 7. Similar to the front link 6, the upper portion of the rear link 13 is inclined rearward of the vehicle compared to the lower portion thereof before the four-bar link is pivoted by the drive source 4.

The rear link 13 rotates about the pin 22 by the driving force of the drive source 4. Preferably, as illustrated in FIG. 5B, the rear link 13 has a rear link gear 25 engaged with the drive source gear 15 that is provided at one end of the rotary shaft of the drive source 4 to coaxially rotate together with the rotary shaft, thereby enabling the rear link 13 to rotate by the rotational driving force of the drive source 4.

FIG. 6B is a side view illustrating a state in which the seat cushion frame illustrated in FIG. 6A is changed after it is driven by the drive source 4.

When the rear link 13 is rotated counterclockwise by the rotational driving force of the drive source 4, the front link 6 is rotated by interlocking therewith so that the position of the outer seat cushion frame 2 is changed.

Figure 15:
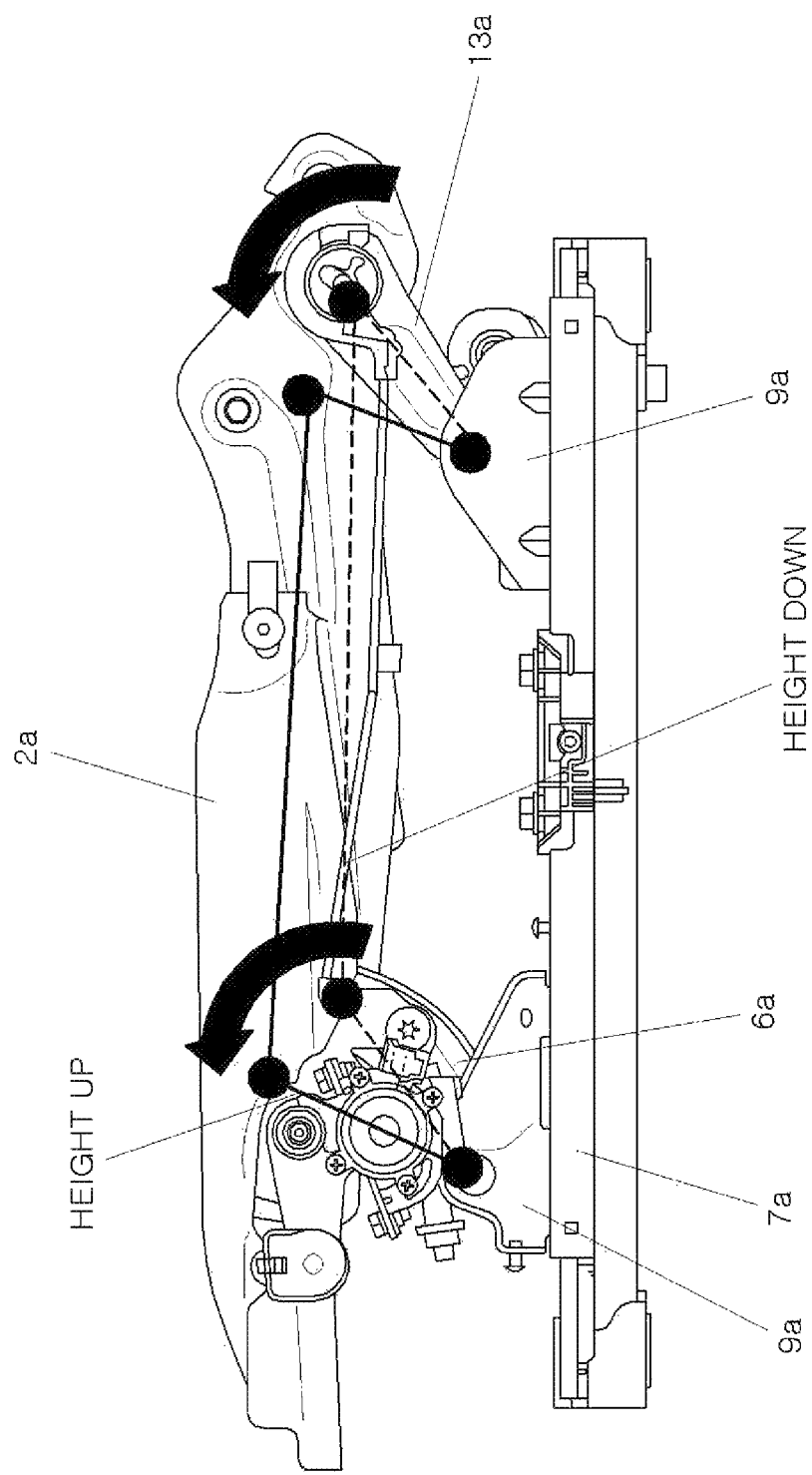
FIG. 15 (RELATED ART) is a side view illustrating a perimeter of an outer seat cushion frame of the conventional vehicle seat when viewed from the outside in the case of adjusting the height of the seat.
Figure 16:
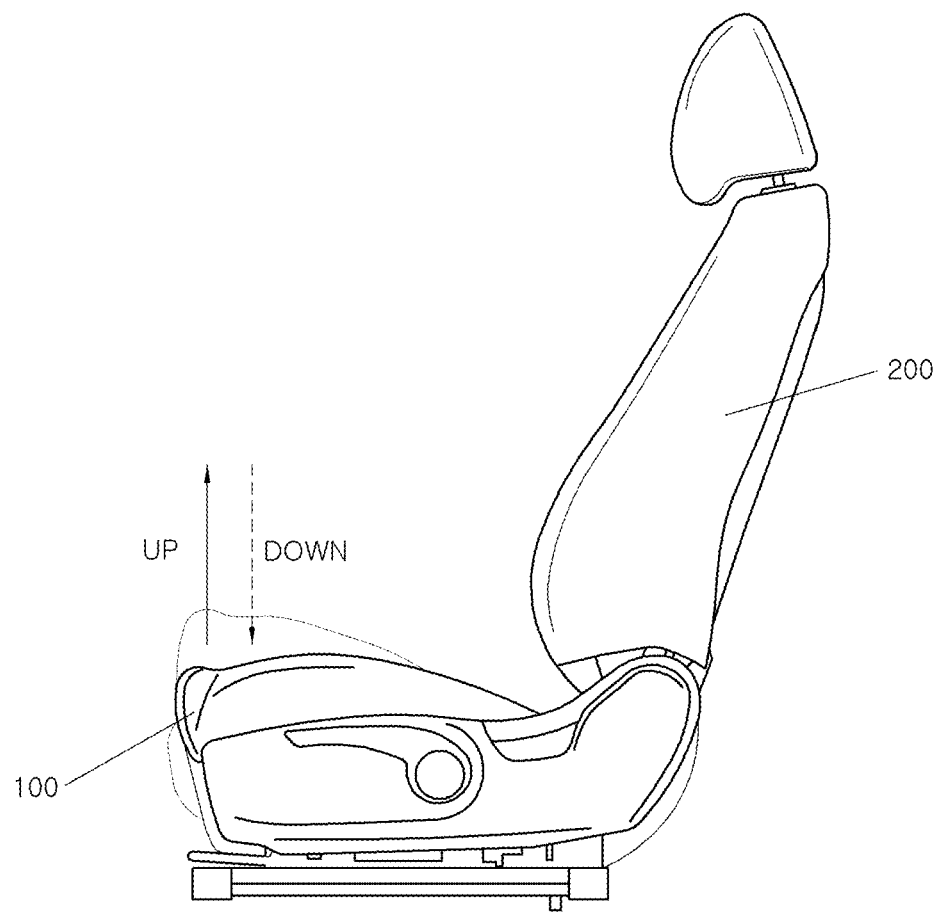
FIG. 16 (RELATED ART) is a side view illustrating a tilting method of the conventional vehicle seat.
Figure 17B:
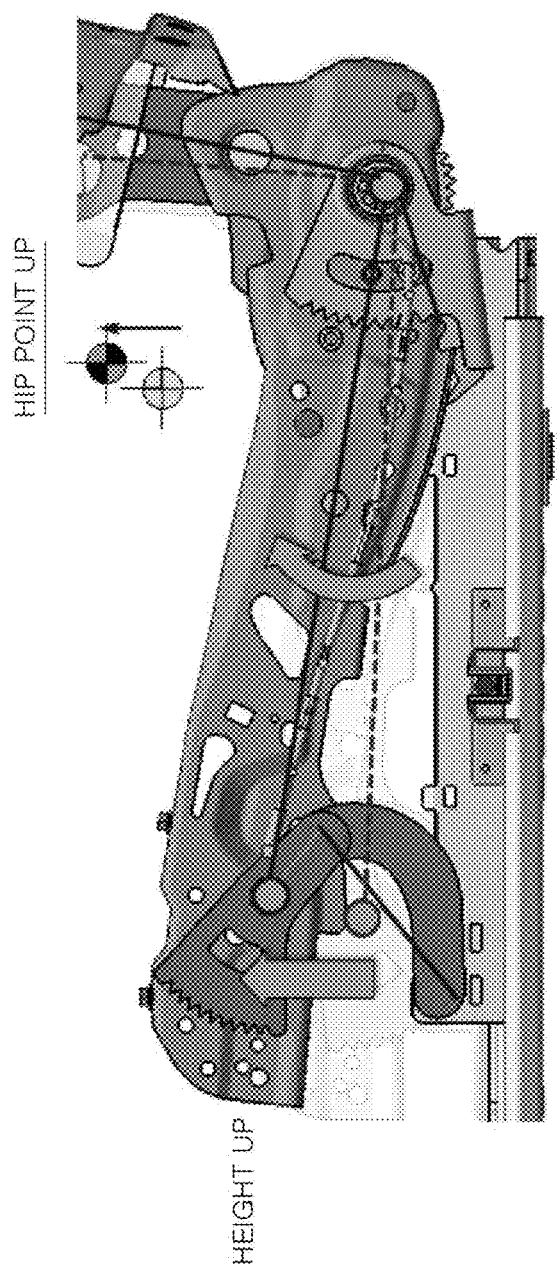

As described above, in the outer seat cushion frame of the conventional vehicle seat illustrated in FIG. 15, both of the seat cushion frame-side end of the front link 6a and the seat cushion frame-side end of the rear link 13a are simultaneously rotated in the same direction (upward). On the contrary, in the preferred embodiment of the present disclosure illustrated in FIG. 6B, the upper portion of the front link 6 rotates upward of the vehicle when the front link 6 rotates about the pin 24, whereas the upper portion of the rear link 13 rotates downward of the vehicle when the rear link 13 rotates about the pin 21. That is, both of the outer seat cushion frame-side end of the front link 6 and the outer seat cushion frame-side end of the rear link 13 simultaneously move in different directions.

As a result, as illustrated in FIG. 6B, the positions of the seat cushion frames 2 and 3 are changed such that the front ends thereof are lifted up and rear ends thereof are moved down. Thus, the hip point is moved down while the knee joint of the driver seated on the seat cushion 100 is moved up. Therefore, it is possible to easily form the thigh's horizontal angle to implement the neutral position in the limited space of the vehicle.

Figure 7A:
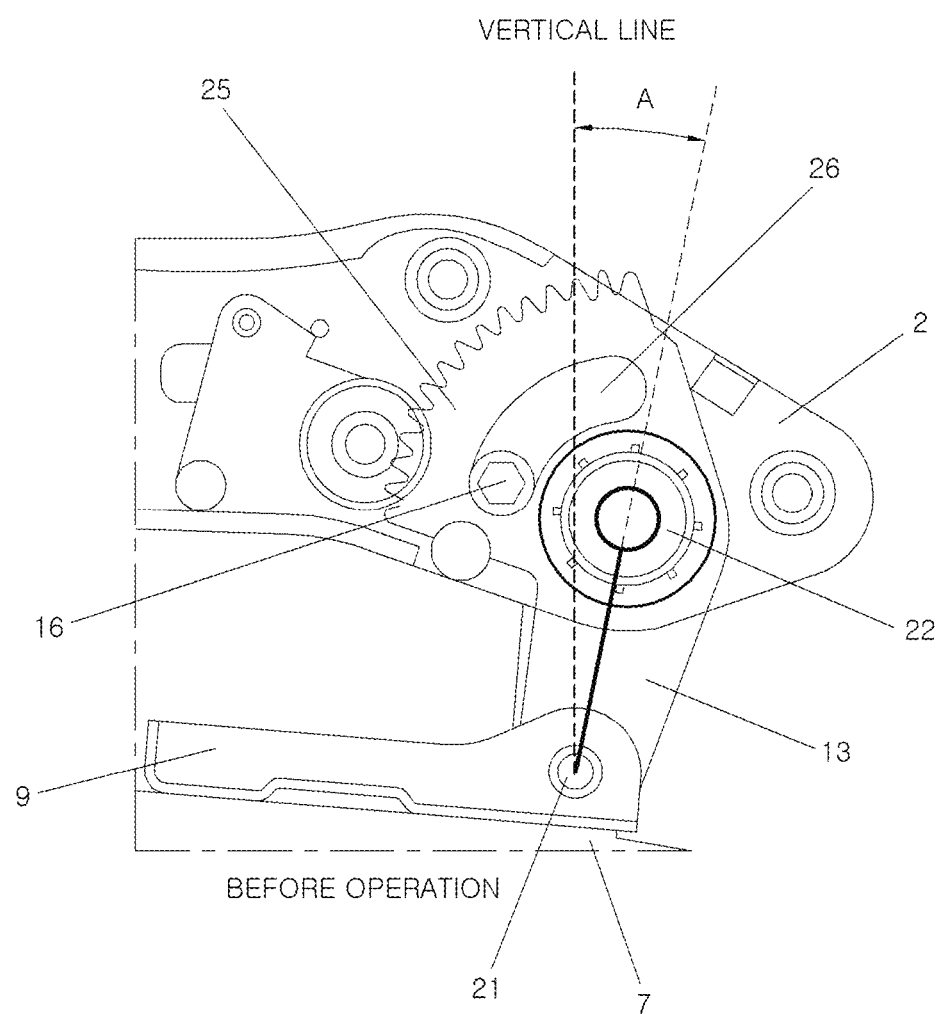
FIG. 7A is a partially enlarged view illustrating part of a rear link in the side view of FIG. 6A.
Figure 7B:
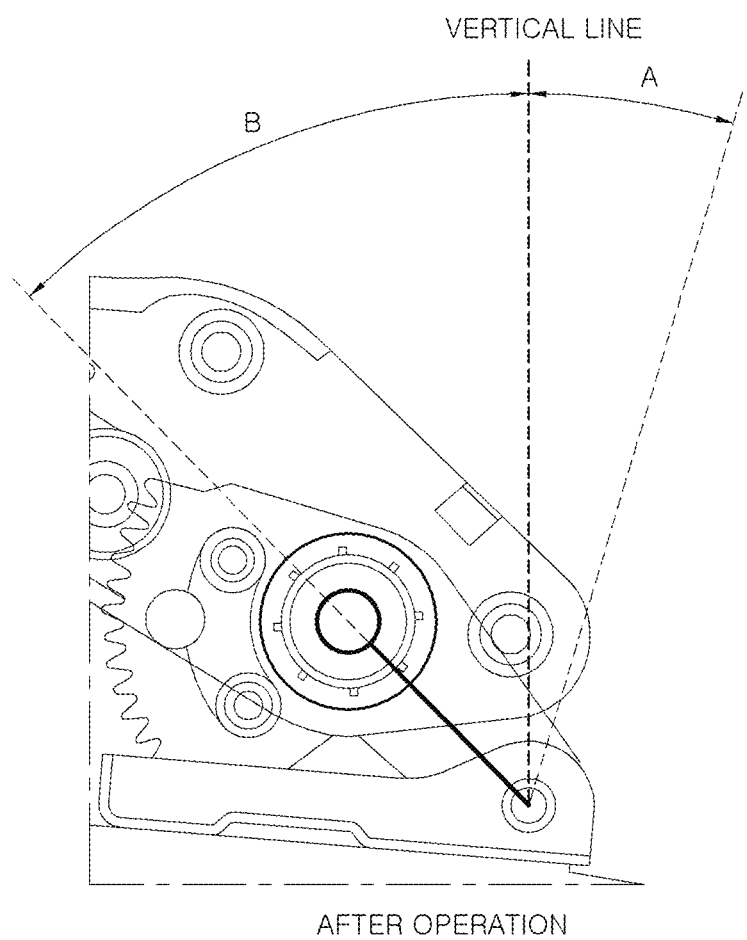
FIG. 7B is a partially enlarged view illustrating part of a rear link in the side view of FIG. 6B.

FIG. 7A is a partially enlarged view illustrating part of the rear link in the side view of FIG. 6A. FIG. 7B is a partially enlarged view illustrating part of the rear link in the side view of FIG. 6B.

FIGS. 7A and 7B illustrate an imaginary vertical line that vertically extends from the pin 13 as a center of rotation of the rear link 13 when the four-bar link pivots, and an imaginary segment that extends from the pin 21 to the pin 22 for pivotably connecting the rear link 13 to the outer seat cushion frame 2.

In the preferred embodiment of the present disclosure, the angle (A) between the imaginary vertical line and the imaginary segment before the rear link 13 is driven by the drive source 4 is less than or equal to ⅓ of the angle (B) between the imaginary vertical line and the imaginary segment in the state in which the rear link 13 is rotated counterclockwise in the forward direction of the vehicle by the drive source 4.

If the angle (A) is greater than ⅓ of the angle (B), the upper end of the front link 6 is already moved down beyond the top dead center at the point of time when the upper end of the rear link 13 begins to be moved down when the four-bar link is pivoted along with the rotation of the rear link 13. Accordingly, unlike the embodiment illustrated in FIG. 6B, both of the upper end of the front link 6 and the upper end of the rear link 13 are simultaneously moved down. Hence, it is impossible to change the positions of the seat cushion frames 2 and 3 such that the front ends thereof are lifted up and rear ends thereof are moved down. Thus, in the preferred embodiment of the present disclosure, the angle (A) is less than or equal to ⅓ of the angle (B).

The angle (A) between the imaginary vertical line and the imaginary segment before the rear link 13 is driven by the drive source 4 is set to be within ±10° with respect to the vertical line.

As the angle (A) is increased, a possibility the front of the link collapses is increased due to the sum of cushion frame weight and passenger load in the event of forward collision of the vehicle. Therefore, to suppress occurrence of this phenomenon, the angle (A) is preferably set to be within ±10° with respect to the vertical line.

Hereinafter, a stopper capable of suppressing deformation of the link due to self-weight in the embodiment illustrated in FIGS. 6A to 7B will be described with reference to FIGS. 9A to 9C.

As described above, due to the cushion frame weight and a passenger load in the event of a forward collision of the vehicle, the link structure is deformed which may lead to deflection of the cushion. Thus, there is a need for a stopper capable of supporting the cushion when a load is applied thereto and preventing deflection of the cushion due to the load.

Figure 9A:
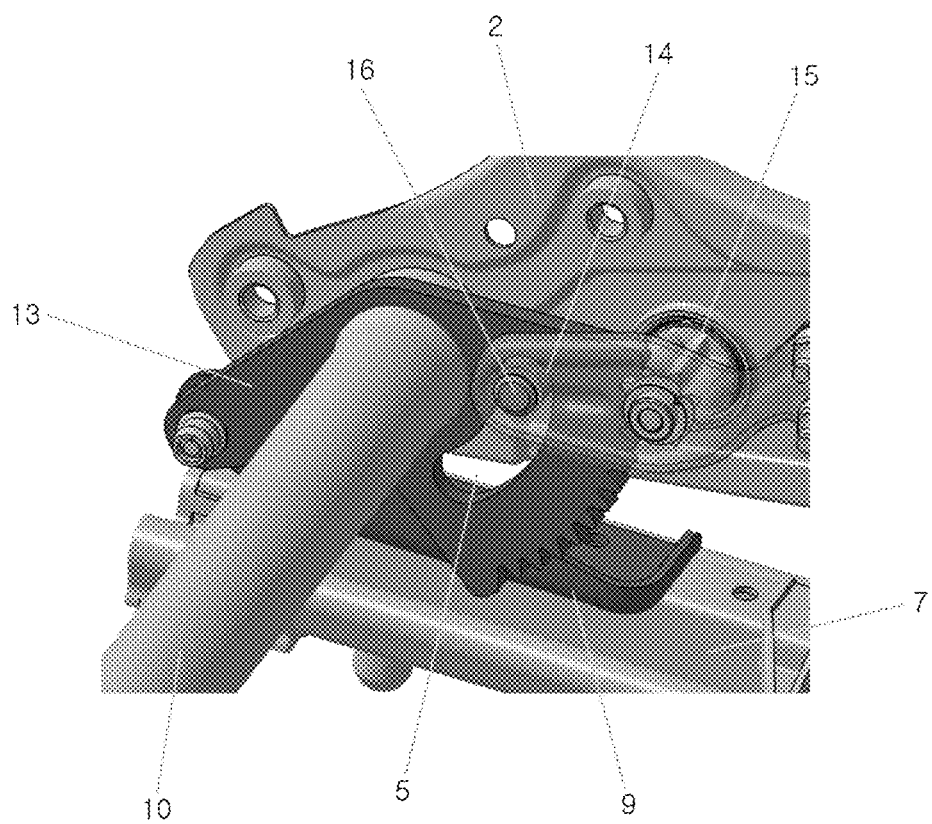
FIG. 9A is a perspective view illustrating connection part between an outer seat cushion frame and a rear link of the vehicle seat according to the present disclosure.

FIG. 9A is a perspective view illustrating connection part between the outer seat cushion frame 2 and the rear link 13 of the vehicle seat according to the present disclosure.

As illustrated in FIG. 9A, the rear link 13 includes a guide hole 5 formed between both ends thereof to pass through both sides, and the rear link gear 25 that is coaxially connected to the rotary shaft of the drive source 4 as an electric motor to engage with the drive source gear 15 rotated by the rotational force of the drive source 4. The outer seat cushion frame 2 is formed with a guide pin support 14 that protrudes from the surface thereof to support the guide pin 16 inserted into the guide hole 26. The guide hole 5 has a circular arc shape such that the guide pin 16 is smoothly moved along the guide hole 5 when the rear link 13 is rotated by the rotational force of the drive source 4.

As a result of this structure, deformation of the link structure due to the load in the event of collision of the vehicle is can be prevented by restricting the rotation of the rear link 13 by the electric motor as the drive source 4, and is secondarily prevented by restricting the rotation of the rear link 13 relative to the outer seat cushion frame 2 by contact between the guide pin 16 and the guide hole 5.

However, if the stopper is provided at the outer seat cushion frame 2 and a separate stopper is not provided at the inner seat cushion frame 3, the load is applied to the inner seat cushion frame 3. Consequently, the load is also transmitted to the outer seat cushion frame 2, causing deflection of the cushion. Thus, it is necessary to provide a stopper to the inner seat cushion frame 3 to prevent deformation of the link structure due to transmission of load.

Figure 9B:
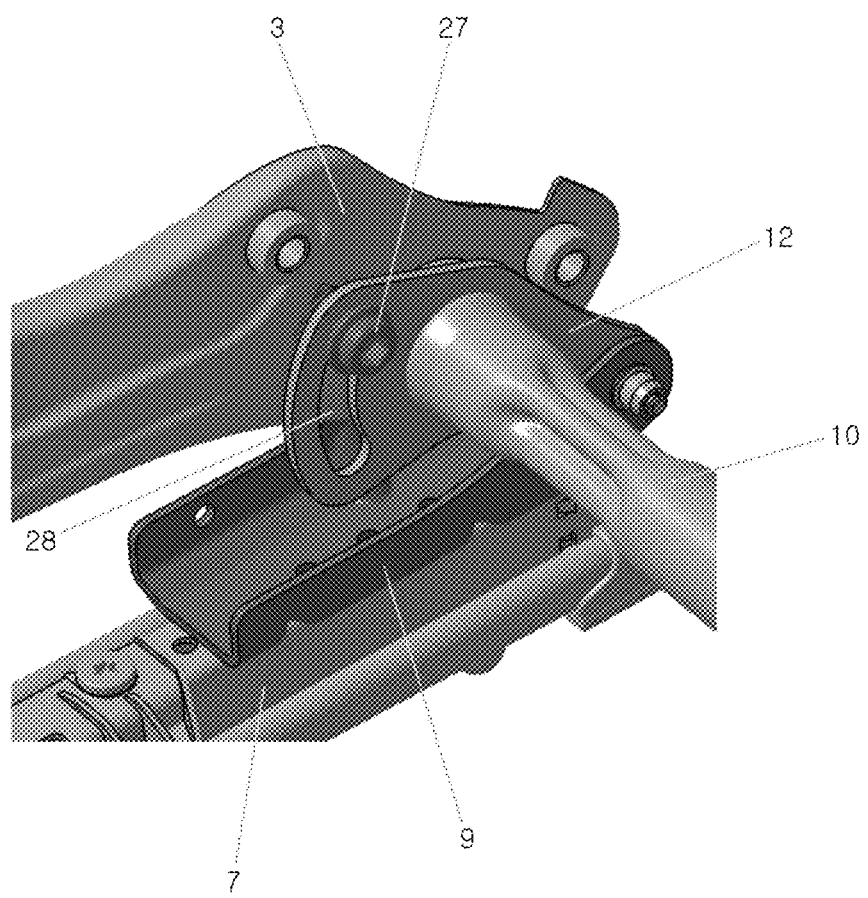
FIG. 9B is a perspective view illustrating connection part between an inner seat cushion frame and a rear link of a vehicle seat according to an embodiment of the present disclosure.

FIG. 9B illustrates an embodiment of a stopper provided at the inner seat cushion frame 3.

In FIG. 9B, similar to the outer seat cushion frame 2, the inner seat cushion frame-side rear link 12 includes a guide hole 28 formed between one end and the other end thereof to pass through both sides. The inner seat cushion frame 3 is formed with a guide pin 27 that protrudes from one side thereof to be inserted into the guide hole 28.

Thus, similar to the outer seat cushion frame 2, deformation of the cushion due to the load can be prevented by restricting the rotation of the rear link 12 relative to the inner seat cushion frame 3 by contact between the guide pin 27 and the guide hole 28.

Figure 9C:
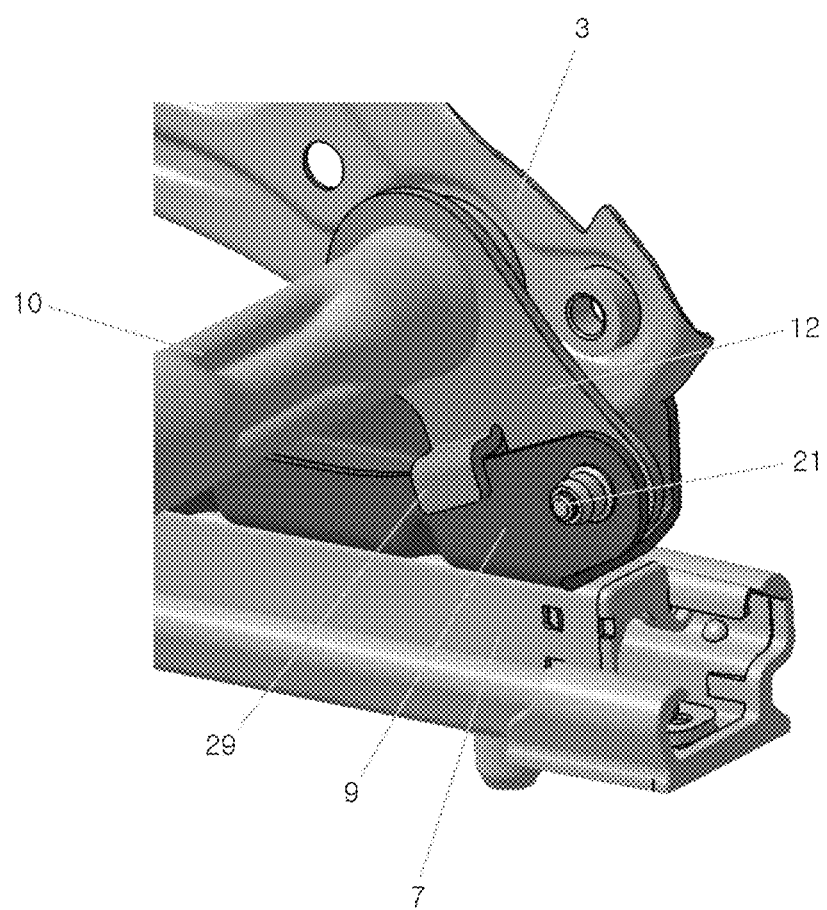
FIG. 9C is a perspective view illustrating connection part between an inner seat cushion frame and a rear link of a vehicle seat according to another embodiment of the present disclosure.

FIG. 9C illustrates another preferred embodiment of a stopper provided at the inner seat cushion frame 3.

In FIG. 9C, one end of the rear link 12 is axially supported by the pin 21 and is pivotably connected to the fixed part 7 by the fixed part bracket 9. The rear link 12 has a protruding portion 29 formed on one side thereof, and the protruding portion 29 has a touch surface that touches the side wall of the fixed part bracket 9.

Thus, since a load is applied to the four-bar link in the event of collision of the vehicle, the protruding portion 29 touches the fixed part bracket 9 when the rear link 12 rotates, thereby restricting the rotation of the rear link relative to the inner seat cushion frame 3. Therefore, it is possible to prevent deflection of the cushion by the load.

Hereafter, different mechanisms for adjusting the position of the seat cushion 100 to implement the neutral position will be described below in detail with reference to FIGS. 10A and 10B.

Figure 10A:
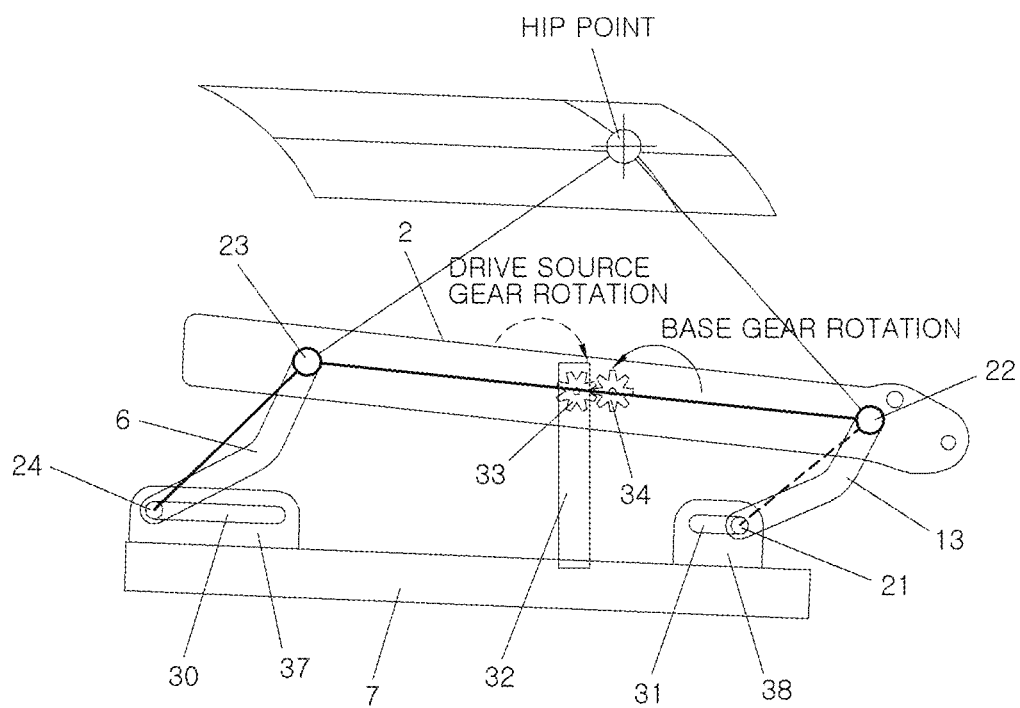
FIG. 10A is a side view illustrating a perimeter of an outer seat cushion frame of a vehicle seat when viewed from the outside before driving by a drive device according to another embodiment of the present disclosure.

FIG. 10A is a side view illustrating a perimeter of an outer seat cushion frame of a vehicle seat when viewed from the outside before driving by a drive device according to another embodiment of the present disclosure.

In the embodiment of FIG. 10A, similar to the embodiment of FIG. 6A, to tilt a seat cushion 100 for adjusting the position thereof, four-bar links are formed that include front links 6 and rear links 12 and 13 pivotably connected to the respective front and rear of outer and inner seat cushion frames 2 and 3, and fixed parts 7 positioned beneath the outer and inner seat cushion frames 2 and 3 to be pivotably connected to the front links 6 and the rear links 12 and 13, and each has a parallelogram shape when viewed from the side.

However, unlike the embodiment illustrated in FIG. 6A, in the embodiment illustrated in FIG. 10A, the lower ends of each of the front links 6 and each of the rear links 12 and 13 are slidably connected to a front link guide 37 and a rear link guide 38 provided at each of the fixed parts 7, respectively. In particular, the front and rear link guides 37 and 38 are respectively formed with guide holes 30 and 31 that longitudinally extend. A pin 24 for axially supporting the lower end of the front link 6 is inserted into the guide hole 30 of the front link guide, and a pin 21 for axially supporting the lower end of the rear link 12 or 13 is inserted into the guide hole 31 of the rear link guide. When the front link 6 and the rear link 12 or 13 are pivoted, the pin 21 and the pin 24 slide along the respective guide holes 30 and 31.

Unlike the embodiment illustrated in FIG. 6A, in the embodiment illustrated in FIG. 10A, a drive source 4 is not installed to the outer seat cushion frame 2, but is positioned at a separate position from the outer seat cushion frame 2 to generate power for rotating the outer seat cushion frame 2 in the clockwise direction. In particular, the drive source 4 is installed at the upper end of a drive source support 32 that extends vertically from the fixed part 7, and a drive source gear 33 is provided at one end of the rotary shaft of the drive source 4 to coaxially rotate together with the rotary shaft. The outer seat cushion frame 2 is provided with a seat cushion frame gear 34 that engages with the drive source gear 33. Thus, when the drive source gear 33 is rotated clockwise by the drive source 4, the outer seat cushion frame 2 is rotated clockwise about the rotary shaft of the seat cushion frame gear 34 engaged with the drive source gear 33.

Figure 10B:
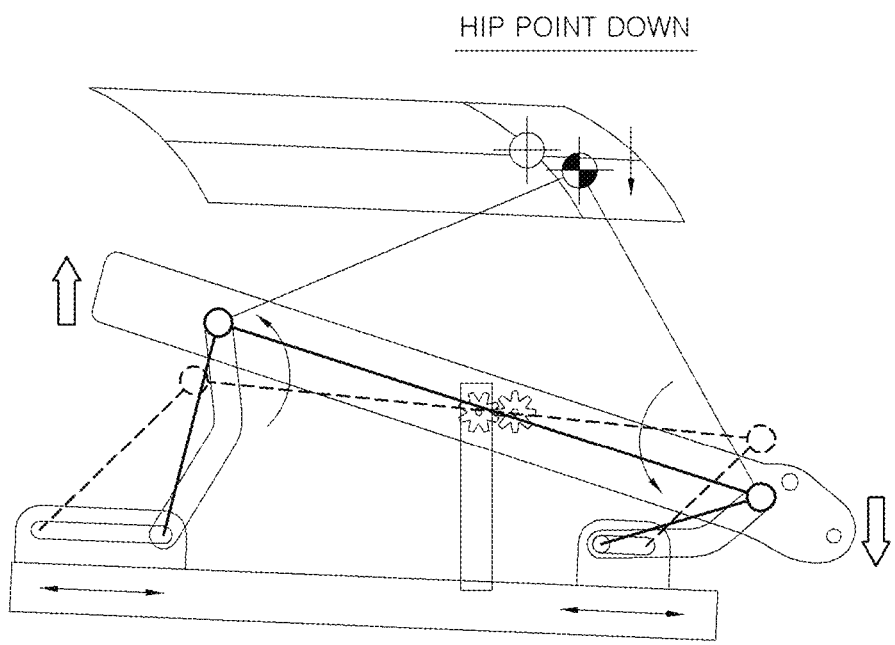
FIG. 10B is a side view illustrating a perimeter of the outer seat cushion frame of the vehicle seat when viewed from the outside after driving by the drive device according to another embodiment of the present disclosure.

FIG. 10B is a side view illustrating a state in which the seat cushion frame of FIG. 10A is changed after it is driven by the drive source 4.

As illustrated in FIG. 1B, when the drive source gear 33 is rotated clockwise by the drive source 4, the outer seat cushion frame 2 is rotated clockwise about the rotary shaft of the seat cushion frame gear 34 engaged with the drive source gear 33. Thus, the front end of the outer seat cushion frame 2 is lifted up and the lower end thereof is moved down. In this case, the end of the front link 6 pivotably connected to the front end of the outer seat cushion frame 2 through the pin 23 is also lifted up and the pin 24 thus slides along the guide hole 30 of the front link guide 37. Similar to the front link 6, the end of the rear link 13 pivotably connected to the rear end of the outer seat cushion frame 2 through the pin 22 is also lifted up and the pin 21 thus slides along the guide hole 31 of the rear link guide 38.

As a result, similar to the embodiment illustrated in FIG. 6B, even in the embodiment illustrated in FIG. 10B, the positions of the seat cushion frames 2 and 3 are changed such that the front ends thereof are lifted up and rear ends thereof are moved down. Thus, the hip point is moved down while the knee joint of the driver seated on the seat cushion 100 is moved up. Therefore, it is possible to easily form the thigh's horizontal angle to implement the neutral position in the limited space of the vehicle.

Figure 11A:
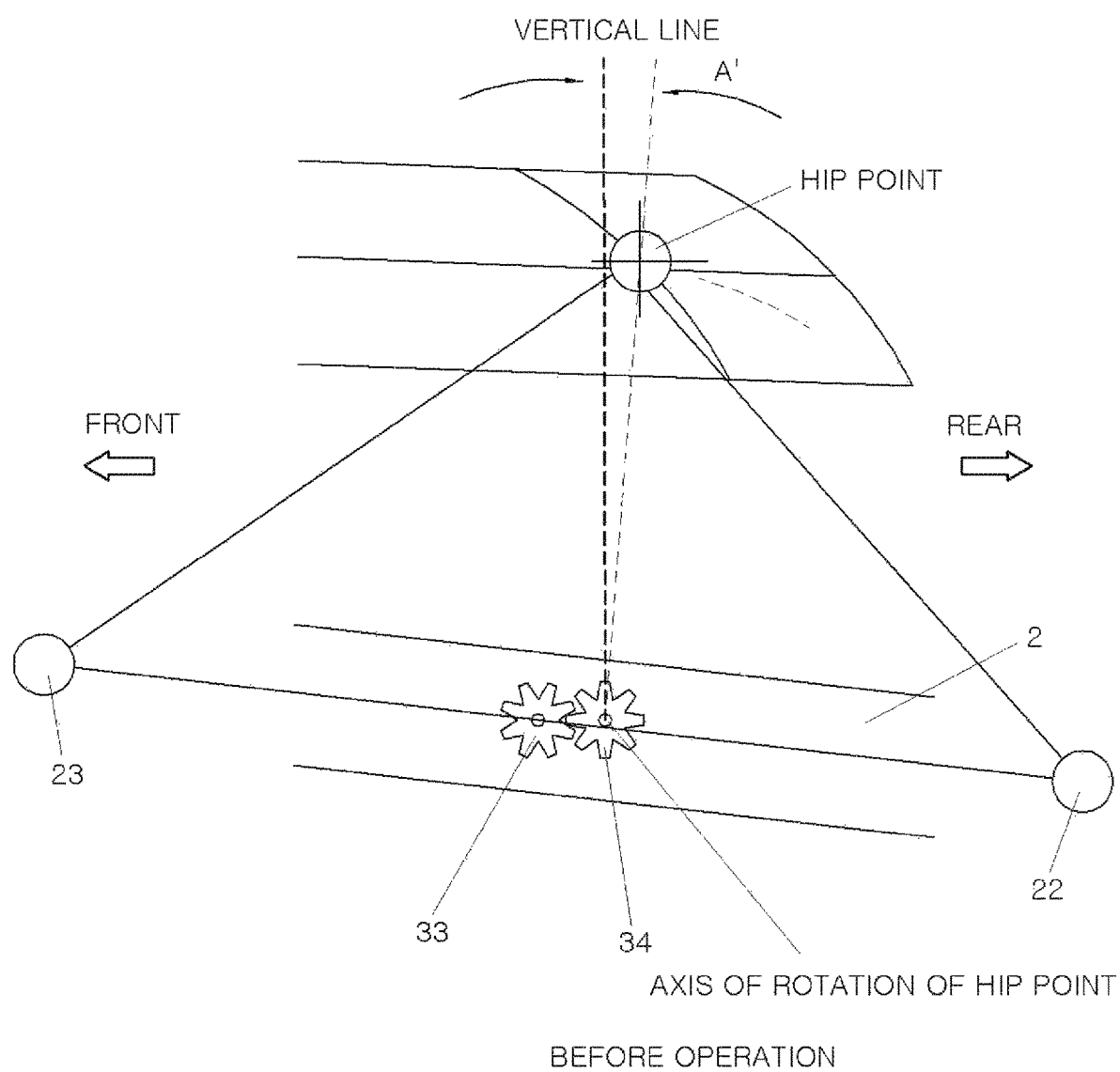
FIG. 11A is a partially enlarged view illustrating part of a drive source gear and a seat cushion frame gear in the side view of FIG. 10A.

FIG. 11A is a partially enlarged view illustrating part of the drive source gear and the seat cushion frame gear in the side view of FIG. 10A.

FIG. 11A illustrates an imaginary vertical line that vertically extends from the center of rotation of the outer seat cushion frame 2, namely the center of rotation of the seat cushion frame gear 34 engaged with the drive source gear 33, and an imaginary segment that extends from the center of rotation of the seat cushion frame gear 34 to the hip point of the occupant.

To set the position of the seat cushion 100 such that the hip point is moved down while the knee joint of the driver seated on the seat cushion 100 is moved up, the imaginary segment illustrated in FIG. 11A should be inclined rearward of the vehicle with respect to the imaginary vertical line. If the imaginary segment is inclined forward of the vehicle with respect to the imaginary vertical line, the hip point is not moved down but is moved up when the outer seat cushion frame 2 is rotated clockwise about the center of rotation thereof because the hip point is present in front of the center of rotation. Hence, it is impossible to change the position such that the hip point is moved down while the knee joint of the driver seated on the seat cushion 100 is moved up. Therefore, in the preferred embodiment of the present disclosure, the imaginary segment is basically inclined rearward of the vehicle with respect to the imaginary vertical line.

Figure 11B:
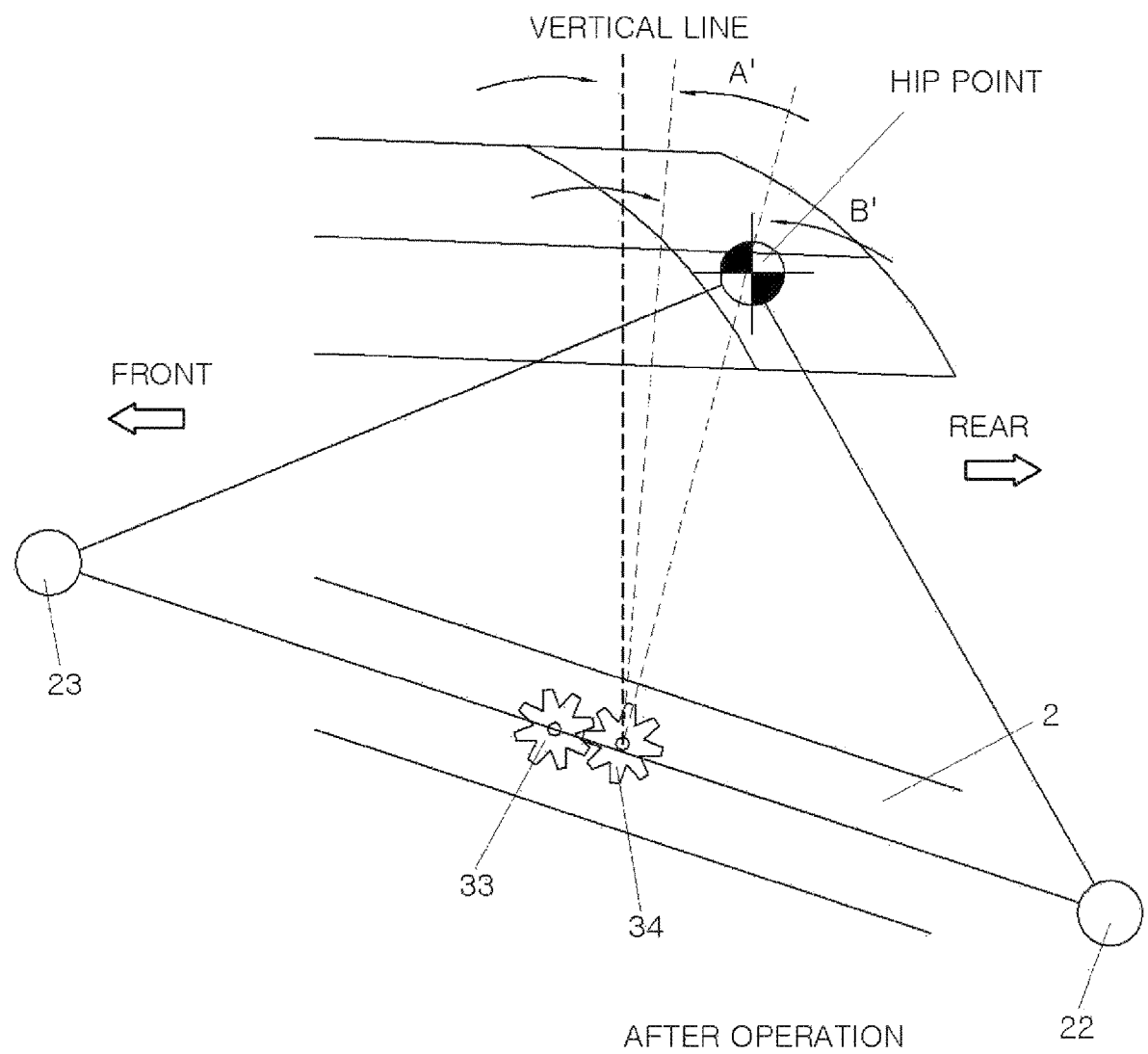
FIG. 11B is a partially enlarged view illustrating part of a drive source gear and a seat cushion frame gear in the side view of FIG. 10B.

FIG. 11B is a partially enlarged view illustrating part of the drive source gear and the seat cushion frame gear in the side view of FIG. 10B.

FIG. 11B illustrates an imaginary vertical line that vertically extends from the center of rotation of the outer seat cushion frame 2, namely the center of rotation of the seat cushion frame gear 34 engaged with the drive source gear 33, an imaginary segment that extends from the center of rotation of the seat cushion frame gear 34 to the hip point of the occupant before the four-bar link is driven by the drive source 4, and an imaginary segment that extends from the center of rotation of the seat cushion frame gear 34 to the hip point of the occupant after the four-bar link is driven by the drive source 4.

Unlike the embodiment illustrated in FIG. 11A, the imaginary segment, which extends from the center of rotation of the seat cushion frame gear 34 to the hip point of the occupant before the four-bar link is driven by the drive source 4, is inclined forward of the vehicle with respect to the imaginary vertical line.

In this case, in order for the hip point to be moved down by the rotation of the outer seat cushion frame 2, the angle (A) between the imaginary vertical line and the imaginary segment, which extends from the center of rotation of the seat cushion frame gear 34 to the hip point of the occupant before the four-bar link is driven by the drive source 4, should be greater than the angle (B) between the imaginary vertical line and the imaginary segment which extends from the center of rotation of the seat cushion frame gear 34 to the hip point of the occupant after the four-bar link is driven by the drive source 4. In this case, the hip point is first moved up when the outer seat cushion frame 2 is rotated clockwise but the hip point is moved down again when the outer seat cushion frame 2 is rotated over a predetermined angle. Thus, in the preferred embodiment of the present disclosure, in the case where the imaginary segment, which extends from the center of rotation of the seat cushion frame gear 34 to the hip point of the occupant before the four-bar link is driven by the drive source 4, is inclined forward of the vehicle with respect to the imaginary vertical line, the angle (B) formed by the imaginary vertical line and the imaginary segment between the center of rotation and the hip point after driving is set to be greater than the angle (A) formed by the imaginary vertical line and the imaginary segment between the center of rotation and the hip point before driving.

Hereafter, a further mechanism for adjusting the position of the seat cushion 100 to implement the neutral position will be described below in detail with reference to FIGS. 12A and 12B.

Figure 12A:
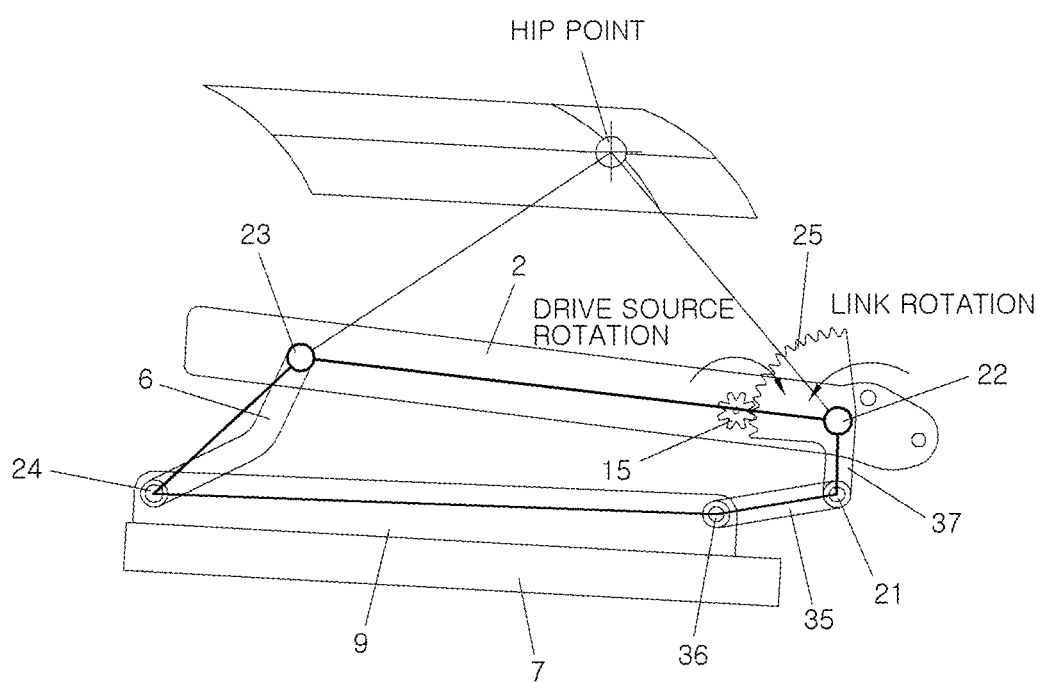
FIG. 12A is a side view illustrating a perimeter of an outer seat cushion frame of a vehicle seat when viewed from the outside before driving by a drive device according to a further embodiment of the present disclosure.

FIG. 12A is a side view illustrating a perimeter of an outer seat cushion frame of a vehicle seat when viewed from the outside before driving by a drive device according to a further embodiment of the present disclosure.

Unlike the embodiment of FIG. 6A or 10A, in the embodiment of the FIG. 12A, to tilt a seat cushion 100 for adjusting the position thereof, a five-bar link is formed that includes a front link 6 and a first rear link 37, the respective one ends of which are pivotably connected to the front and rear of each of outer and inner seat cushion frames 2 and 3, a second rear link 35, one end of which is pivotably conected to the other end of the first rear link 37, and a fixed part 7 which is positioned beneath the outer or inner seat cushion frame 2 or 3 while the other end of the front link 6 is pivotably connected to the fixed part 7 and the other end of the second rear link 35 is connected to the fixed part 7 so as not to pivot.

In particular, as illustrated in FIG. 12A, the upper end of the front link 6 is axially supported by a pin 23 to be pivotably connected to the front end of the outer seat cushion frame 2 positioned in the longitudinal direction of the vehicle. The lower end of the front link 6 is axially supported by a pin 24 to be pivotably connected to a fixed bracket 9 of the fixed part 7. The upper portion of the front link 6 is inclined rearward of the vehicle compared to the lower portion thereof before the five-bar link is pivoted by a drive source 4.

The upper end of the first rear link 37 is axially supported by a pin 22 to be pivotably connected to the rear end of the outer seat cushion frame 2 positioned in the longitudinal direction of the vehicle. The lower end of the first rear link 37 is axially supported by a pin 21 to be pivotably connected to the upper end of the second rear link 35. The lower end of the second rear link 35 is axially supported by a pin 36, and is fixed to the fixed part bracket 9 so as not to pivot. Similar to the front link 6, the upper portion of the second rear link 35 is inclined rearward of the vehicle compared to the lower portion thereof before the five-bar link is pivoted by the drive source 4.

The first rear link 37 is rotated about thepin 22 by the driving force of the drive source 4. Preferably, as illustrated in FIG. 12A, the first rear link 37 has a rear link gear 25 engaged with a drive source gear 15 that is provided at one end of the rotary shaft of the drive source 4 to coaxially rotate together with the rotary shaft, thereby enabling the first rear link 37 to rotate by the rotational driving force of the drive source 4.

Figure 12B:
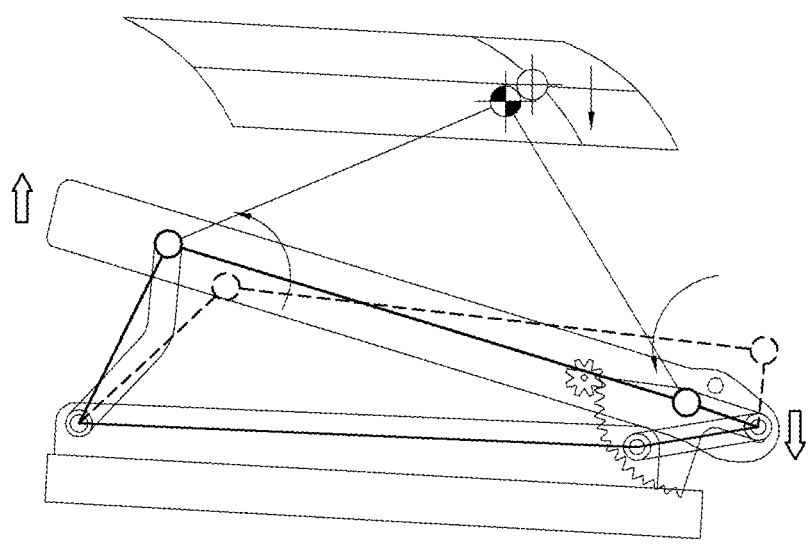
FIG. 12B is a side view illustrating a perimeter of the outer seat cushion frame of the vehicle seat when viewed from the outside after driving by the drive device in a tilting mode according to the further embodiment of the present disclosure.

FIG. 12B is a side view illustrating a state in which the seat cushion frame illustrated in FIG. 12A is changed after it is driven by the drive source 4.

When the rear link 13 is rotated by the rotational driving force of the drive source 4, the five-bar links rotated by interlocking therewith so that the position of the outer seat cushion frame 2 is changed. In this case, the position of the second rear link 35 is fixed to the fixed part 7. Therefore, when the first rear link 37 rotates about the pin 22, the upper portion of the first rear link 37 is inclined forward and downward of the vehicle about the pin 21. In this case, the front link 6 is also pivoted forward and upward of the vehicle by interlocking with the rotation of the first rear link 37. That is, both of the outer seat cushion frame-side end of the front link 6 and the outer seat cushion frame-side end of the first rear link 37 simultaneously move in different directions.

As a result, as illustrated in FIG. 12B, the positions of the seat cushion frames 2 and 3 are changed such that the front ends thereof are lifted up and rear ends thereof are moved down. Thus, the hip point is moved down while the knee joint of the driver seated on the seat cushion 100 is moved up. Therefore, it is possible to easily form the thigh's horizontal angle to implement the neutral position in the limited space of the vehicle.

Figure 12C:
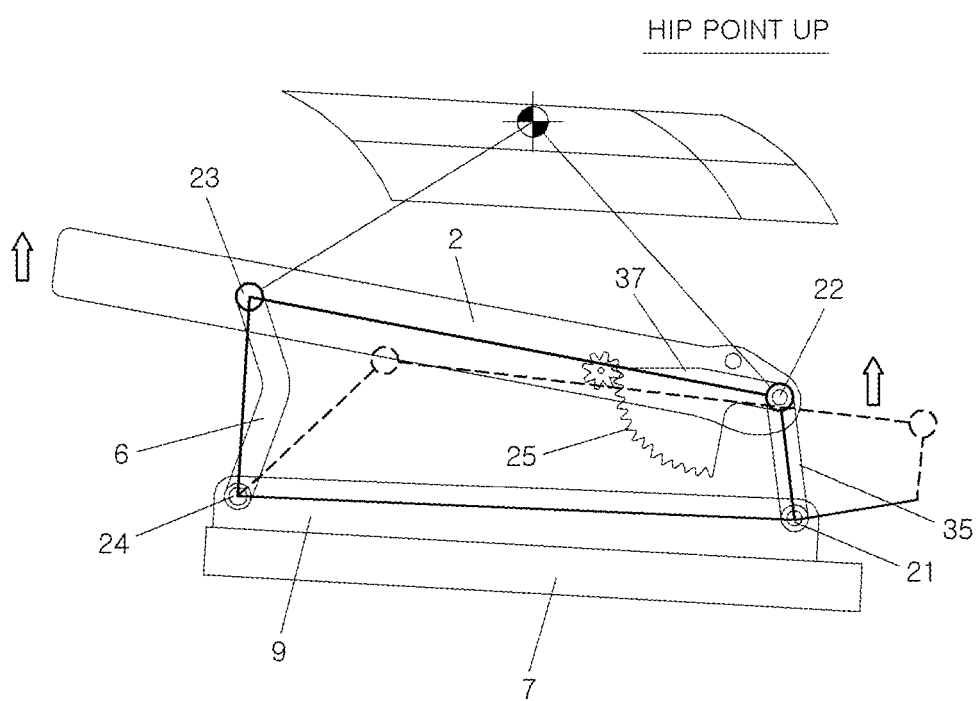
FIG. 12C is a side view illustrating a perimeter of the outer seat cushion frame of the vehicle seat when viewed from the outside after driving by the drive device in a height adjustment mode according to the further embodiment of the present disclosure.
Figure 13:
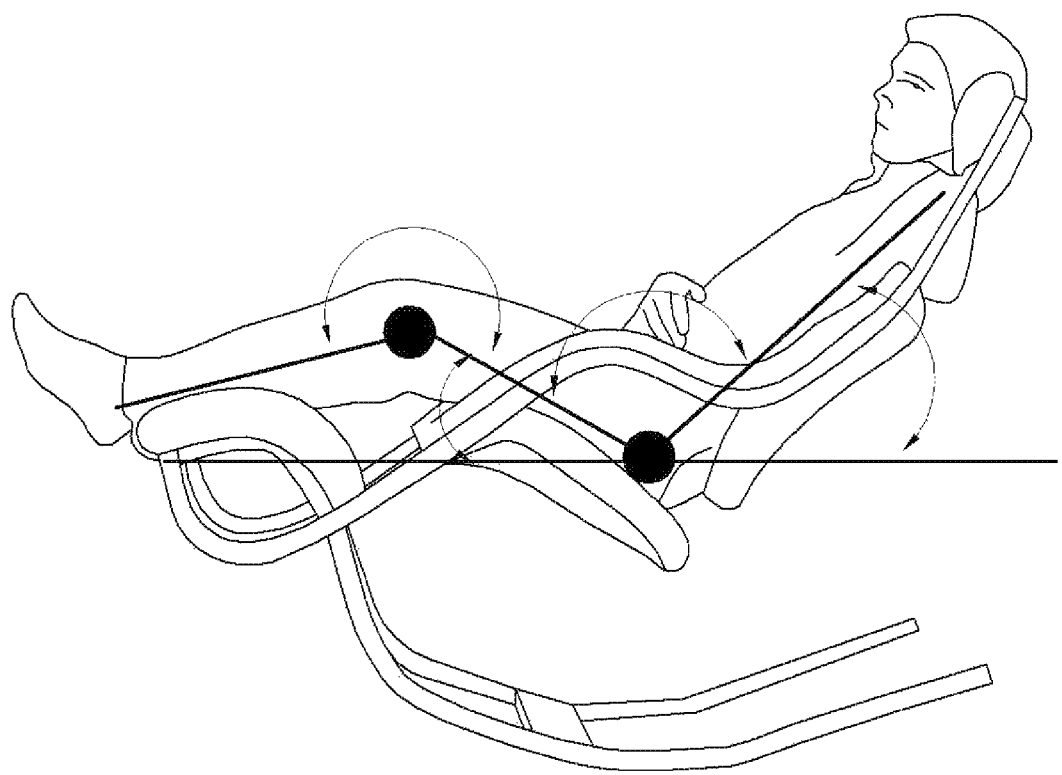
FIG. 13 is a side view illustrating a human weightless neutral position.
Figure 14:
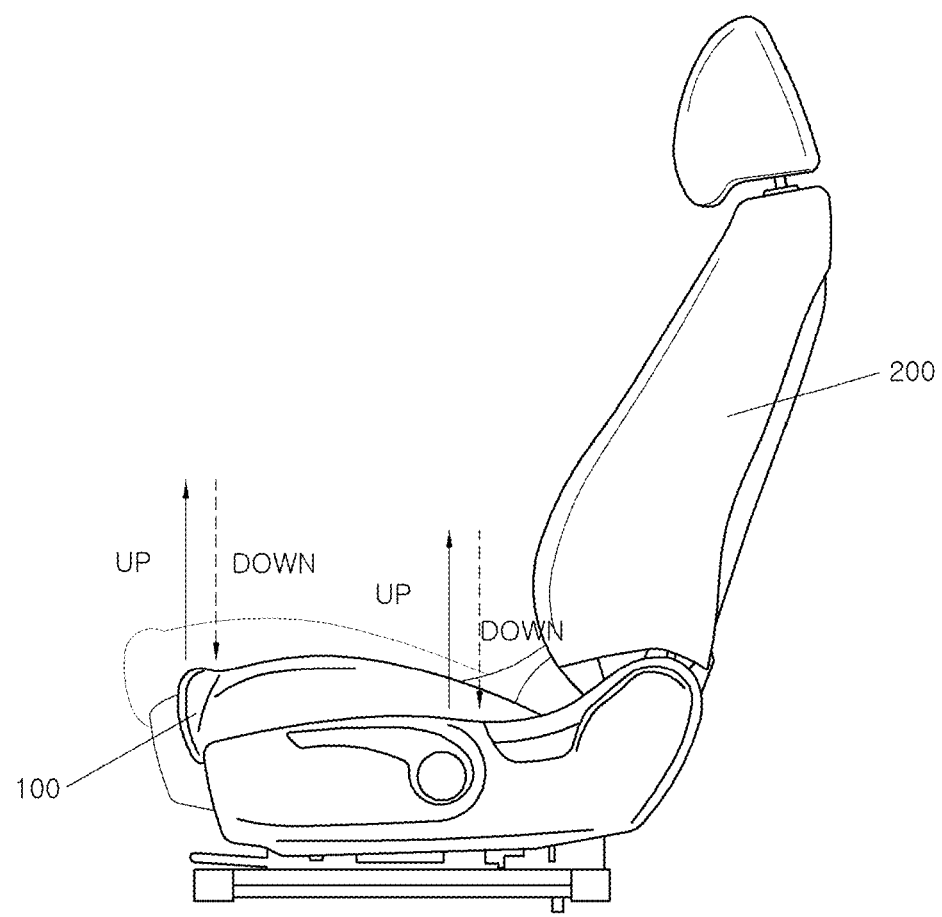
FIG. 14 (RELATED ART) is a side view illustrating a method of adjusting a height of a conventional vehicle seat.

FIG. 12C is a view illustrating a change of the seat cushion frame when it is driven by the drive source 4 in the case where the lower end of the second rear link 35 is axially supported by the pin 21 to be pivotably connected to the fixed part bracket 9 and the lower end of the first rear link 37 is axially supported by the pin 35 and connected to the upper end of the second rear link 35 so as not to pivot in the embodiment illustrated in FIG. 12A.

In this case, unlike that illustrated in FIG. 12B, when the first rear link 37 is rotated about the pin 22 by the drive source 4, the first and second rear links 37 and 35 are integrally rotated about the pin 21 because the first rear link 37 is connected to the second rear link 35 so as not to pivot. Thus, the rear end of the outer seat cushion frame 2 pivotably connected to one end of the first rear link 37 is lifted up. The front link 6 is also pivoted forward and upward of the vehicle as the first and second rear links 37 and 35 are integrally rotated. Thus, the front end of the outer seat cushion frame 2 pivotably connected to one end of the front link 6 is also lifted up. As a result, the height of the seat cushion 100 is rised in general.

In regard to this matter, in the preferred embodiment of the present disclosure, the connection between the fixed part 7 and the second rear link 35 and the connection between the first rear link 37 and the second rear link 35 are selectively pivoted.

That is, in the mode that implements the neutral position, the connection between the fixed part 7 and the second rear link 35 is switched so as not to pivot and the connection between the first rear link 37 and the second rear link 35 is switched so as to pivot. In the mode that adjusts the seat height, the connection between the fixed part 7 and the second rear link 35 is switched so as to pivot and the connection between the first rear link 37 and the second rear link 35 is switched so as not to pivot. In this case, both of the height adjustment mode and the neutral position mode may be implemented by a single drive device.

Meanwhile, it is possible to switch the connection between two links between a rotatable mode and a nonrotatable mode. For example, when one link has a pin movable in the direction of protruding to the outside from the surface using an electric device or a hydraulic device and another link has a hole for insertion of the pin, the connection between two links may be switched so as not to pivot by protruding the pin of the link and inserting the pin into the hole of another link. In addition, when the connection between two links is switched so as to pivot, the connection between two links may be switched so as to pivot by moving the pin in the direction opposite to the protruding direction to separated the pin from the hole of another link.

In accordance with the vehicle seat and the method for controlling a sitting position using the same of the present disclosure, it is possible to implement the neutral position since the thigh's horizontal angle is significantly increased, compared to that in the conventional seat, by departing from the constraint of the knee space in the vehicle. Thus, it is possible for blood to easily flow to the heart and the brain by distributing the conventional load concentrated on the driver's hips and lumbar vertebra during driving over a wider range to prevent blood pooling. Therefore, it is possible to remarkably reduce the driver's fatigue during driving for a long time.

In addition, when the thigh's horizontal angle is increased, the angle of inclination of the seat back is also increased. Thus, it is possible to implement the intended upper/lower body angle and upper body's horizontal angle only by adjusting the thigh's horizontal angle according to the increase of the thigh's horizontal angle and to implement the neutral position by only one drive source for adjusting the thigh's horizontal angle. Therefore, it is possible to expect a reduction in manufacturing cost by simplifying the mechanism for the implementation of the neutral position.

In addition, it is possible to enhance driving safety since the driver's hip point or center of gravity is moved down, compared to that in the conventional seat, by implementing the neutral position.

Figure 18A:
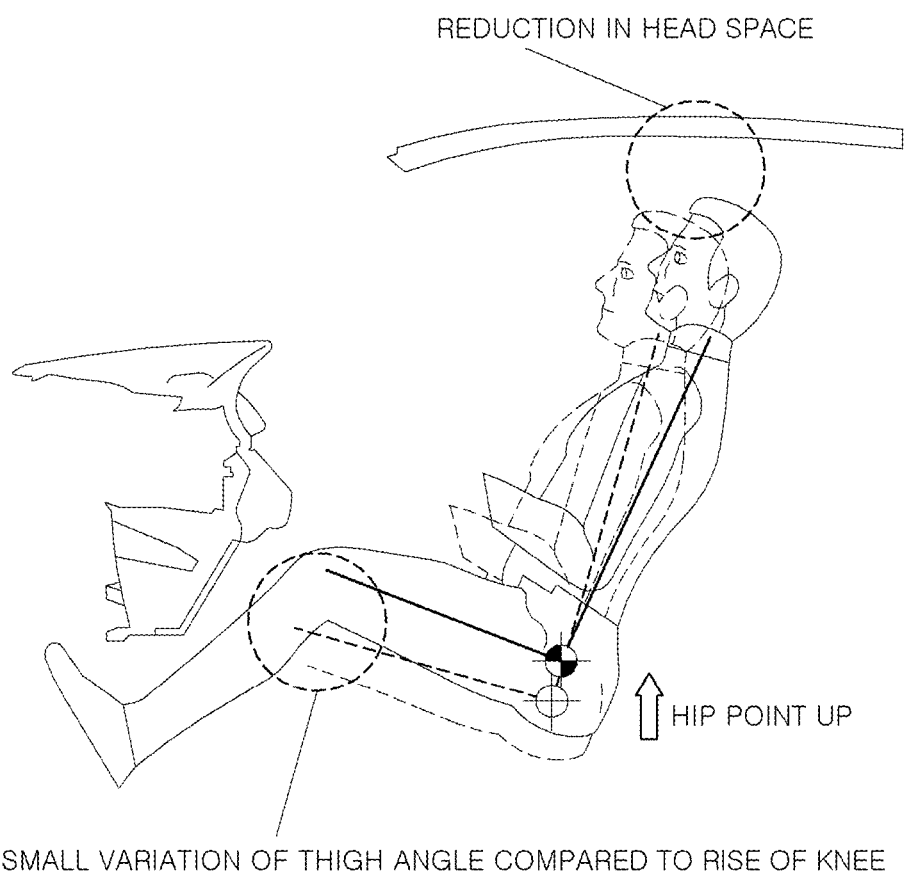
FIG. 18A (RELATED ART) is a side view illustrating a sitting position of a driver seated on the conventional vehicle seat.
Figure 18B:
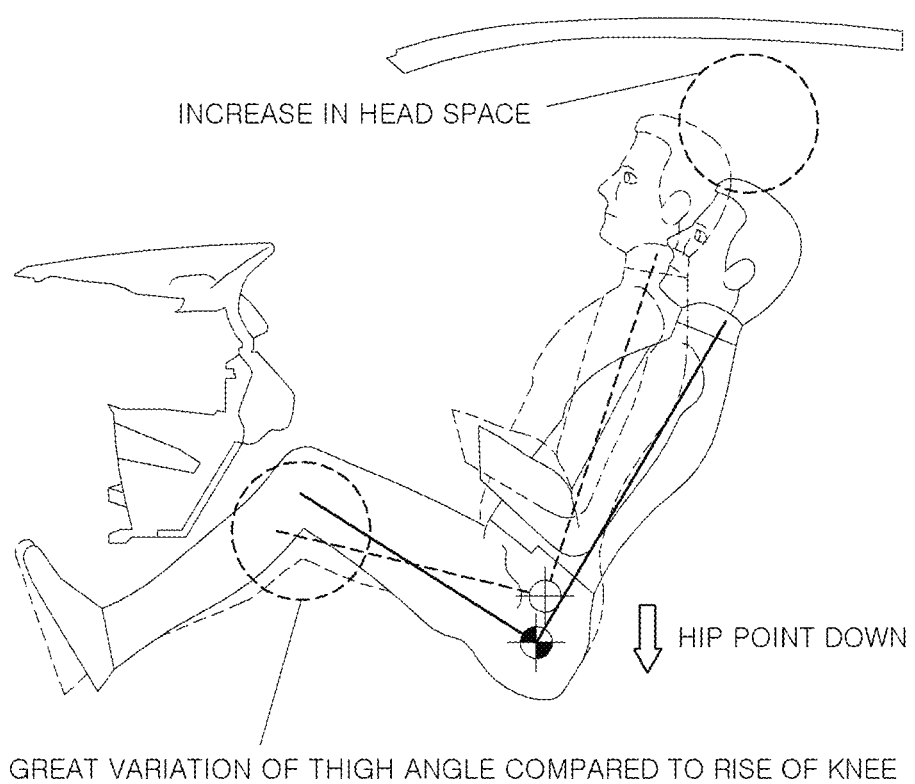
FIG. 18B is a side view illustrating a sitting position of a driver seated on the vehicle seat according to the present disclosure.

There is an increasing need for a hydrodynamic vehicle design that allows a roof line to be low as a result of consumer demand for various vehicle designs to increase fuel efficiency by reducing air resistance or secure driving safety in recent years. In accordance with the vehicle seat and the method for controlling a sitting position using the same of the present disclosure, it is possible to easily address the tendency to lower the overall height of the vehicle since the sitting position is kept low and the headroom is sufficiently secured, as illustrated in FIG. 18B.

While the present disclosure has been described with respect to the specific embodiments, it will be apparent to those skilled in the art that various changes and modifications may be made without departing from the spirit and scope of the disclosure as defined in the following claims.

What is claimed is:

1. A vehicle seat configured to adjust a position of a seat cushion by a multi-bar link provided at each of both sides of the seat cushion, wherein:

the multi-bar link comprises one seat cushion frame of a plurality of seat cushion frames forming both side frames of the seat cushion, and front and rear links pivotably connected to the respective front and rear of the one seat cushion frame;

the vehicle seat comprises a drive device configured to rotate the multi-bar link such that an end of the front link connected to the one seat cushion frame is lifted up and an end of the rear link connected to the one seat cushion frame is simultaneously moved down;

the multi-bar link is a four-bar link comprising the one seat cushion frame and the front link, the rear link, and a fixed part positioned beneath the one seat cushion frame and pivotably connected to the front and rear links;

the drive device comprises a drive source gear provided at the one seat cushion frame, one end of the drive source gear being connected to a rotatable drive source, and a rear link gear provided at the rear link to engage with the drive source gear, the rear link gear allowing the multi-bar link to rotate by rotation of the drive source gear;

the seat cushion frames include an inner seat cushion frame and an outer seat cushion frame, and the drive device is provided at the outer seat cushion frame; and the rear link pivotably connected to the outer seat cushion frame has a stopper for restricting a driving range of the four-bar link.

2. The vehicle seat of claim 1, wherein an angle formed by the rear link and an imaginary vertical line in an initial position before the rear link is rotated by the drive device, when viewed from the side of a vehicle, is less than or equal to ⅓ of an angle formed by the rear link and the vertical line when the rear link is rotated forward of the vehicle by the drive device.

3. The vehicle seat of claim 2, wherein the angle formed by the rear link and the imaginary vertical line in the initial position before the rear link is rotated by the drive device is within ±10° with respect to the vertical line.

4. The vehicle seat of claim 1, wherein the stopper comprises a guide hole formed between one end and the other end of the rear link to pass through both sides thereof, and a guide pin protruding from one side of the inner seat cushion frame to be inserted into the guide hole, the guide pin restricting the rotation of the rear link by contact with the guide hole when the rear link rotates.

5. The vehicle seat of claim 1, wherein the stopper has a touch surface, which touches a fixed part bracket disposed to the fixed part to support the rear link, to restrict the rotation of the rear link.

6. The vehicle seat of claim 1, wherein:
the rear link includes a first rear link pivotably connected to the one seat cushion frame, and a second rear link, one end of which is connected to the first rear link while the other end thereof is connected to a fixed part positioned beneath the one seat cushion frame so as not to pivot;
the multi-bar link is a five-bar link comprising the one seat cushion frame, the front link, the first rear link, the second rear link, and the fixed part pivotably connected to the front link; and
the drive device comprises a drive source gear, one end of which is connected to a rotatable drive source, and a rear link gear provided at the first rear link to engage with the drive source gear, the rear link gear allowing the five-bar link to rotate by rotation of the drive source gear.

7. A vehicle seat configured to adjust a position of a seat cushion by a multi-bar link provided at each of both sides of the seat cushion, wherein:
the multi-bar link is a four-bar link comprising the one seat cushion frame, the front link, the rear link, and a fixed part positioned beneath the one seat cushion frame and pivotably connected to the front and rear links:
one end of the front link and one end of the rear link are connected to the fixed part so as to slide in a longitudinal direction of a vehicle through respective front and rear guides: and
the drive device rotates the one seat cushion frame about a predetermined point between both ends of the one seat cushion frame,
a drive source gear, one end of which is connected to a rotatable drive source; and
a seat cushion frame gear provided at the one seat cushion frame to engage with the drive source gear, the one seat cushion frame gear allowing the multi-bar link to rotate by rotation of the drive source gear.

8. The vehicle seat of claim 7, wherein a pin formed at one end of the front link and a pin formed at one end of the rear link are respectively provided at the front guide and the rear guide to be inserted into respective guide holes extending in the longitudinal direction of the vehicle, thereby being connected to the fixed part so as to be slidable along the guide holes in the longitudinal direction of the vehicle.

9. The vehicle seat of claim 7, wherein, in an initial position before the drive device is driven, an imaginary segment extending to a hip point of an occupant from the point, when viewed from the side of the vehicle, is positioned rearward of the vehicle compared to an imaginary vertical line extending vertically from the point.

10. The vehicle seat of claim 7, wherein, when viewed from the side of the vehicle, an angle formed by an imaginary vertical line extending vertically from the point and an imaginary segment extending between the point and a hip point of an occupant after the drive device is driven is greater than an angle formed by the vertical line and an imaginary segment extending between the point and a hip point of an occupant before the drive device is driven.

11. A vehicle seat configured to adjust a position of a seat cushion by a multi-bar link provided at each of both sides of the seat cushion, wherein:
the multi-bar link comprises one seat cushion frame of plurality of seat cushion frames forming both side frames of the seat cushion, and front and rear links pivotably connected to the respective front and rear of the one seat cushion frame;
the vehicle seat comprises a drive device configured to rotate the multi-bar link such that an end of the front link connected to the one seat cushion frame is lifted up and an end of the rear link connected to the one seat cushion frame is simultaneously moved down, wherein:
the rear link includes a first rear link pivotably connected to the one seat cushion frame, and a second rear link, one end of which is selectively pivotably connected to the first rear link while the other end thereof is selectively pivotably connected to a fixed part positioned beneath the one seat cushion frame;
the multi-bar link is a five-bar link comprising the one seat cushion frame, the front link, the first rear link, the second rear link, and the fixed part pivotably connected to the front link;
the drive device comprises a drive source gear, one end of which is connected to a rotatable drive source, and a rear link gear provided at the first rear link to engage with the drive source gear, the rear link gear allowing the five-bar link to rotate by rotation of the drive source gear;
when the seat cushion is tilted, a connection between the second rear link and the fixed part is switched so as not to pivot and a connection between the first rear link and the second rear link is switched so as to pivot; and
when a height of the seat cushion is adjusted, the connection between the second rear link and the fixed part is switched so as to pivot and the connection between the first rear link and the second rear link is switched so as not to pivot.

12. The vehicle seat of claim 11, wherein the rotatable drive source is an electric motor or a pumping lever manually operated.

13. The vehicle seat of claim 11, wherein a front end of the seat cushion positioned in a longitudinal direction of a vehicle is configured to be lifted and simultaneously moving down a rear end thereof such that the seat is moved from a first seat position, which is a basic position when an occupant is seated in the vehicle, to a second seat position at which a thigh angle of the occupant to a horizontal direction of the vehicle is a predetermined angle.

14. The method of claim 13, wherein the thigh angle is 28° to 32°.

15. The vehicle seat of The method of claim 14, wherein a position of a seat back is configured to be adjusted such that an upper/lower body angle between upper and lower bodies of the occupant is 105° to 125° in a state in which the thigh angle is maintained in the above between 28° to 32°.

16. The vehicle seat of claim 15, wherein an upper body angle of the occupant to the horizontal direction of the vehicle is configured to be adjusted in a predetermined range so as to secure a forward field of view of the occupant in a state in which the thigh angle and the upper/lower body angle of the occupant are maintained in the above range.

17. The method of claim 16, wherein the upper body angle of the occupant to the horizontal direction of the vehicle is 32° to 47°.

* * * * *